US010922088B2

(12) United States Patent
Liu et al.

(10) Patent No.: US 10,922,088 B2
(45) Date of Patent: Feb. 16, 2021

(54) PROCESSOR INSTRUCTION SUPPORT TO DEFEAT SIDE-CHANNEL ATTACKS

(71) Applicant: Intel Corporation, Santa Clara, CA (US)

(72) Inventors: Fangfei Liu, Hillsboro, OR (US); Bin Xing, Hillsboro, OR (US); Michael Steiner, Hillsboro, OR (US); Mona Vij, Hillsboro, OR (US); Carlos Rozas, Portland, OR (US); Francis McKeen, Portland, OR (US); Meltem Ozsoy, Hillsboro, OR (US); Matthew Fernandez, Portland, OR (US); Krystof Zmudzinski, Forest Grove, OR (US); Mark Shanahan, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 16/024,733

(22) Filed: Jun. 29, 2018

(65) Prior Publication Data

US 2020/0004552 A1 Jan. 2, 2020

(51) Int. Cl.

| | |
|---|---|
| ***G06F 9/38*** | (2018.01) |
| ***G06F 9/30*** | (2018.01) |
| ***G06F 21/55*** | (2013.01) |

(52) U.S. Cl.

CPC .......... *G06F 9/3865* (2013.01); *G06F 9/3016* (2013.01); *G06F 9/30134* (2013.01); *G06F 21/554* (2013.01); *G06F 2221/034* (2013.01)

(58) Field of Classification Search

CPC .... G06F 9/3865; G06F 9/3016; G06F 21/554; G06F 2212/1052; G06F 9/30134;

(Continued)

(56) References Cited

U.S. PATENT DOCUMENTS 6,408,380 B1 * 6/2002 Huck ................. G06F 9/30043 711/149
7,047,394 B1 * 5/2006 Van Dyke ........... G06F 9/30167 703/26

(Continued)

OTHER PUBLICATIONS

Coppens B., et al., "Practical Mitigations for Timing-Based Side-Channel Attacks on Modem x86 Processors," in 30th IEEE Symposium on Security and Privacy, May 17-20, 2009, pp. 45-60.

(Continued)

*Primary Examiner* — Farley Abad

(74) *Attorney, Agent, or Firm* — Nicholson De Vos Webster & Elliott LLP

(57) ABSTRACT

Detailed herein are systems, apparatuses, and methods for a computer architecture with instruction set support to mitigate against page fault- and/or cache-based side-channel attacks. In an embodiment, an apparatus includes a decoder to decode a first instruction, the first instruction having a first field for a first opcode that indicates that execution circuitry is to set a first flag in a first register that indicates a mode of operation that redirects program flow to an exception handler upon the occurrence of an event. The apparatus further includes execution circuitry to execute the decoded first instruction to set the first flag in the first register that indicates the mode of operation and to store an address of an exception handler in a second register.

14 Claims, 18 Drawing Sheets

FETCH AN INSTRUCTION HAVING A FIELD FOR AN OPCODE TO INDICATE THAT EXECUTION CIRCUITRY IS TO CLEAR A FLAG IN A FIRST REGISTER THAT INDICATES AN EVENT-NOTIFY MODE AND TO CAUSE A TRACKING BIT IN AT LEAST ONE OF A DATA TRANSLATION LOOKASIDE BUFFER, A DATA CACHE, AN INSTRUCTION TRANSLATION LOOKASIDE BUFFER, AND AN INSTRUCTION CACHE TO BE CLEARED
801

DECODE THE INSTRUCTION
803

EXECUTE THE DECODED INSTRUCTION TO: CLEAR A FLAG IN THE FIRST REGISTER THAT INDICATES THE EVENT-NOTIFY MODE AND TO CAUSE THE TRACKING BIT IN AT LEAST ONE OF THE DATA TRANSLATION LOOKASIDE BUFFER, THE DATA CACHE, THE INSTRUCTION TRANSLATION LOOKASIDE BUFFER, AND THE INSTRUCTION CACHE TO BE CLEARED
805

WRITE A RESULT OF THE EXECUTED INSTRUCTION
807

(58) Field of Classification Search
CPC ........... G06F 2221/034; G06F 12/1491; G06F 9/30145; G06F 21/556; G06F 12/1027
See application file for complete search history.

(56) References Cited

U.S. PATENT DOCUMENTS

| | | | | |
|---|---|---|---|---|
| 7,174,405 | B1 * | 2/2007 | Dumov | G06F 13/4243 710/200 |
| 9,405,708 | B1 * | 8/2016 | Pohlack | G06F 21/54 |
| 2003/0105943 | A1 * | 6/2003 | Yeh | G06F 9/3004 712/216 |
| 2007/0219771 | A1 * | 9/2007 | Verheyen | G06F 11/261 703/15 |
| 2007/0283146 | A1 * | 12/2007 | Neveux | G06F 21/74 713/166 |
| 2010/0205415 | A1 * | 8/2010 | Henry | G06F 9/30058 712/234 |
| 2013/0179643 | A1 | 7/2013 | Gueron et al. | |

OTHER PUBLICATIONS

Gruss D., et al., "Strong and Efficient Cache Side-Channel Protection using Hardware Transactional Memory," in Proceedings of the 26th USENIX Security Symposium, Aug. 16-18, 2017, pp. 217-233.
Kong J., et al., "Hardware-Software Integrated Approaches to Defend Against Software Cache-based Side Channel Attacks," in IEEE 15th International Symposium on High Performance Computer Architecture, HPCA 2009, Mar. 2009, pp. 393-404.
Liu F., et al., "CATalyst: Defeating Last-Level Cache Side Channel Attacks in Cloud Computing," in IEEE International Symposium on High Performance Computer Architecture (HPCA), Mar. 12-16, 2016, pp. 406-418.
Liu F., et al., "Random Fill Cache Architecture," in Proceedings of the 47th Annual IEEE/ACM International Symposium on Microarchitecture (Micro), 2014, pp. 203-215.
Moon S.J., et al., "Nomad: Mitigating Arbitrary Cloud Side Channels via Provider-Assisted Migration," in Proceedings of the 22nd ACM Sigsac Conference on Computer and Communications Security (CCS '15), Oct. 12-16, 2015, pp. 1595-1606.
Shin M.W., et al., "T-SGX: Eradicating Controlled-Channel Attacks Against Enclave Programs," Proceedings of the 2017 Annual Network and Distributed System Security Symposium (NDSS), Feb. 26-Mar. 1, 2017, 15 pages.
Shinde S., et al., "Preventing Page Faults from Telling Your Secrets," in Proceedings of the 11th ACM on ASIA Conference on Computer and Communications Security, CCS'16, May 30-Jun. 3, 2016, pp. 317-328.
Wang Z., et al., "A Novel Cache Architecture with Enhanced Performance and Security," in Proceedings of the 41st Annual IEEE/ACM International Symposium on Microarchitecture (Micro 41), IEEE Computer Society, 2008, pp. 88-93.
Wang Z., et al., "New Cache Designs for Thwarting Software Cache-Based Side Channel Attacks," ISCA '07 Proceedings of the 34th Annual International Symposium on Computer Architecture, ACM Sigarch Computer Architecture News, vol. 35 (2), Jun. 9-13, 2007, pp. 494-505.
Zhang Y., et al., "Düppel: Retrofitting Commodity Operating Systems to Mitigate Cache Side Channels in the Cloud," in Proceedings of the ACM Sigsac Conference on Computer and Communications Security, CCS'13, Nov. 4-8, 2013, pp. 827-837.
European Search Report and Written Opinion, EP App. No. 19177146.8, dated Dec. 2, 2019, 9 pages.
Intel, "Software Guard Extensions Programming Reference", Ref. No. 329298-001, Sep. 2013, 156 pages.
Strackx et al., "The Heisenberg Defense: Proactively Defending SGX Enclaves against p.-Table-Based Side-Channel Attacks", Cornell University, arXiv:1712.08519v1 [cs.CR], Dec. 22, 2017, pp. 1-16.

* cited by examiner

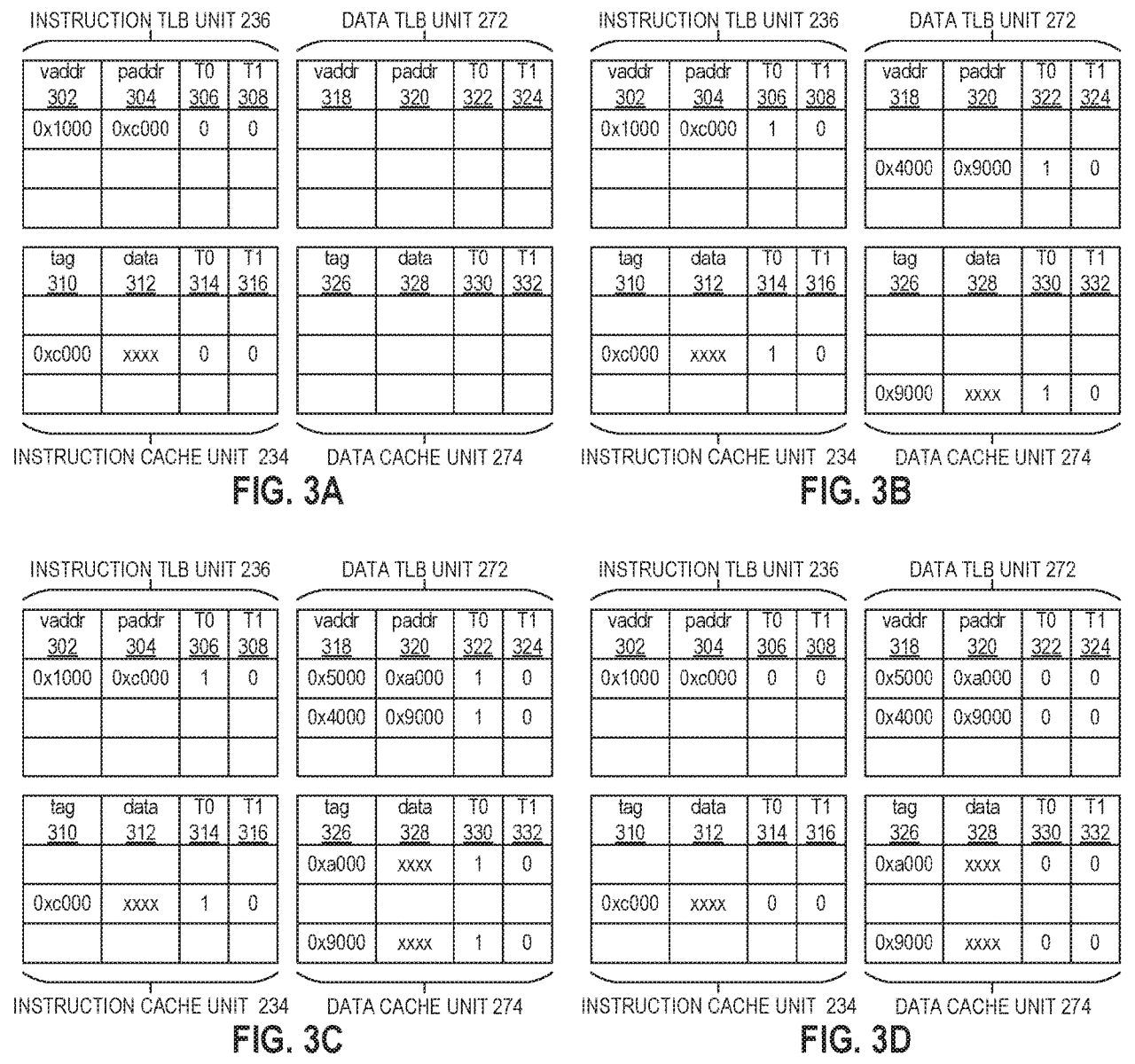

INSTRUCTION TLB UNIT 236

| vaddr 302 | paddr 304 | T0 306 | T1 308 |
|---|---|---|---|
| 0x1000 | 0xc000 | 0 | 0 |
| | | | |
| | | | |

DATA TLB UNIT 272

| vaddr 318 | paddr 320 | T0 322 | T1 324 |
|---|---|---|---|
| | | | |
| | | | |
| | | | |

INSTRUCTION CACHE UNIT 234

| tag 310 | data 312 | T0 314 | T1 316 |
|---|---|---|---|
| | | | |
| 0xc000 | xxxx | 0 | 0 |
| | | | |

DATA CACHE UNIT 274

| tag 326 | data 328 | T0 330 | T1 332 |
|---|---|---|---|
| | | | |
| | | | |
| | | | |

FIG. 3A

INSTRUCTION TLB UNIT 236

| vaddr 302 | paddr 304 | T0 306 | T1 308 |
|---|---|---|---|
| 0x1000 | 0xc000 | 1 | 0 |
| | | | |
| | | | |

DATA TLB UNIT 272

| vaddr 318 | paddr 320 | T0 322 | T1 324 |
|---|---|---|---|
| | | | |
| 0x4000 | 0x9000 | 1 | 0 |
| | | | |

INSTRUCTION CACHE UNIT 234

| tag 310 | data 312 | T0 314 | T1 316 |
|---|---|---|---|
| | | | |
| 0xc000 | xxxx | 1 | 0 |
| | | | |

DATA CACHE UNIT 274

| tag 326 | data 328 | T0 330 | T1 332 |
|---|---|---|---|
| | | | |
| | | | |
| 0x9000 | xxxx | 1 | 0 |

FIG. 3B

INSTRUCTION TLB UNIT 236

| vaddr 302 | paddr 304 | T0 306 | T1 308 |
|---|---|---|---|
| 0x1000 | 0xc000 | 1 | 0 |
| | | | |
| | | | |

DATA TLB UNIT 272

| vaddr 318 | paddr 320 | T0 322 | T1 324 |
|---|---|---|---|
| 0x5000 | 0xa000 | 1 | 0 |
| 0x4000 | 0x9000 | 1 | 0 |
| | | | |

INSTRUCTION CACHE UNIT 234

| tag 310 | data 312 | T0 314 | T1 316 |
|---|---|---|---|
| | | | |
| 0xc000 | xxxx | 1 | 0 |
| | | | |

DATA CACHE UNIT 274

| tag 326 | data 328 | T0 330 | T1 332 |
|---|---|---|---|
| 0xa000 | xxxx | 1 | 0 |
| | | | |
| 0x9000 | xxxx | 1 | 0 |

FIG. 3C

INSTRUCTION TLB UNIT 236

| vaddr 302 | paddr 304 | T0 306 | T1 308 |
|---|---|---|---|
| 0x1000 | 0xc000 | 0 | 0 |
| | | | |
| | | | |

DATA TLB UNIT 272

| vaddr 318 | paddr 320 | T0 322 | T1 324 |
|---|---|---|---|
| 0x5000 | 0xa000 | 0 | 0 |
| 0x4000 | 0x9000 | 0 | 0 |
| | | | |

INSTRUCTION CACHE UNIT 234

| tag 310 | data 312 | T0 314 | T1 316 |
|---|---|---|---|
| | | | |
| 0xc000 | xxxx | 0 | 0 |
| | | | |

DATA CACHE UNIT 274

| tag 326 | data 328 | T0 330 | T1 332 |
|---|---|---|---|
| 0xa000 | xxxx | 0 | 0 |
| | | | |
| 0x9000 | xxxx | 0 | 0 |

FIG. 3D

INSTRUCTION TLB UNIT 236
vaddr 302
paddr 304
T0 306
T1 308
0x1000
0xc000
1
0
INSTRUCTION CACHE UNIT 234
tag 310
data 312
T0 314
T1 316
0xc000
xxxx
1
0
DATA TLB UNIT 272
vaddr 318
paddr 320
T0 322
T1 324
0x5000
0xa000
1
0
0x4000
0x9000
1
0
DATA CACHE UNIT 274
tag 326
data 328
T0 330
T1 332
0xa000
xxxx
1
0
0x9000
xxxx
1
0
ENTRY IS EVICTED INSTRUCTION TLB UNIT 236
vaddr 302
paddr 304
T0 306
T1 308
0x1000
0xc000
0
0
INSTRUCTION CACHE UNIT 234
tag 310
data 312
T0 314
T1 316
0xc000
xxxx
0
0
DATA TLB UNIT 272
vaddr 318
paddr 320
T0 322
T1 324
0x5000
0xa000
0
0
0x4000
0x9000
0
0
DATA CACHE UNIT 274
tag 326
data 328
T0 330
T1 332
0xa000
xxxx
0
0

WRITE MASK REGISTERS
1226
16-WIDE VECTOR ALU
1228
SWIZZLE
1220
VECTOR
REGISTERS
1214
NUMERIC
CONVERT
1222B
L1 DATA CACHE
1206A
REPLICATE
1224
NUMERIC
CONVERT
1222A

INSTRUCTION DECODE
1200
VECTOR
UNIT
1210
SCALAR
UNIT
1208
VECTOR
REGISTERS
1214
SCALAR
REGISTERS
1212
L1 CACHE
1206
LOCAL SUBSET OF THE L2
CACHE
1204
INTERCONNECT NETWORK
1202

PROCESSOR INSTRUCTION SUPPORT TO DEFEAT SIDE-CHANNEL ATTACKS

FIELD OF THE INVENTION

The field of invention relates generally to computer processor architecture, and, more specifically, to instructions which when executed cause a processor to operate in a side-channel protected mode.

BACKGROUND

Certain classes of software-based side-channel attacks involve one software program (an attacker) obtaining information about another program (a victim) by exploiting a common underlying resource (e.g., a central processing unit or CPU). Exemplary side-channel attacks include page fault-based attacks and cache-based attacks. Page fault-based attacks are side-channel attacks that target programs executed inside a trusted execution environment, in which the operating system (OS) is not in the trusted computing base. An attacker such as a malicious OS can perform a side-channel attack by observing the sequences of page faults during a program's execution by actively manipulating the page table or by passively observing changes in control bits of a page table entry. In this manner, the attacker can obtain the memory access pattern of the program during execution. If the memory access pattern depends on the secret information being processed, the attacker can infer the secret information indirectly. Cache-based side-channel attacks are more general attacks based on caches that are shared by programs executed by a CPU. The timing differences between a victim's cache misses and cache hits enables an attacker such as a malicious program to infer cache access patterns (e.g., which cache location is accessed and when it is accessed) of the victim. Based on those patterns, the attacker can infer secret information being processed by the victim program.

BRIEF DESCRIPTION OF THE DRAWINGS

The present invention is illustrated by way of example and not limitation in the accompanying figures, in which like references indicate similar elements.

FIGS. 3A-3D illustrate an exemplary data cache unit, an exemplary instruction cache unit, an exemplary instruction translation lookaside buffer unit, and an exemplary data translation lookaside buffer during execution of a series of exemplary instructions.

FIG. 12A is a block diagram of a single processor core, along with its connection to the on-die interconnect network 1202 and with its local subset of the Level 2 (L2) cache 1204, according to embodiments of the invention.

FIG. 12B is an expanded view of part of the processor core in FIG. 12A according to embodiments of the invention.

FIG. 14 shown a block diagram of a system in accordance with one embodiment of the present invention.

FIG. 15 is a block diagram of a first more specific exemplary system in accordance with an embodiment of the present invention.

FIG. 16 is a block diagram of a second more specific exemplary system in accordance with an embodiment of the present invention.

FIG. 17 is a block diagram of a SoC in accordance with an embodiment of the present invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed herein are embodiments of a set of instructions and hardware support to detect and protection against side-channel attacks. In particular, the disclosed embodiments relate to a set of instructions that software programs can leverage to eliminate the ability of an attacker to obtain secret information. In particular, the instructions place a processor in a side-channel protected mode (referred to as an "event-notify mode"). In the event-notify mode, certain events that might be indicative of a side-channel attack cause user-level program execution to redirect through a user-level exception handler. The user-level exception handler allows the user-level program to prevent an attacker from observing cache or memory access patterns by pinning critical or sensitive information in a cache (to prevent cache-based attacks) or a translation lookaside buffer (TLB) (to prevent page fault-based attacks). With the instructions and hardware support, user-level programs can incorporate a lightweight protection mechanism against side-channel attacks.

Figure 1:
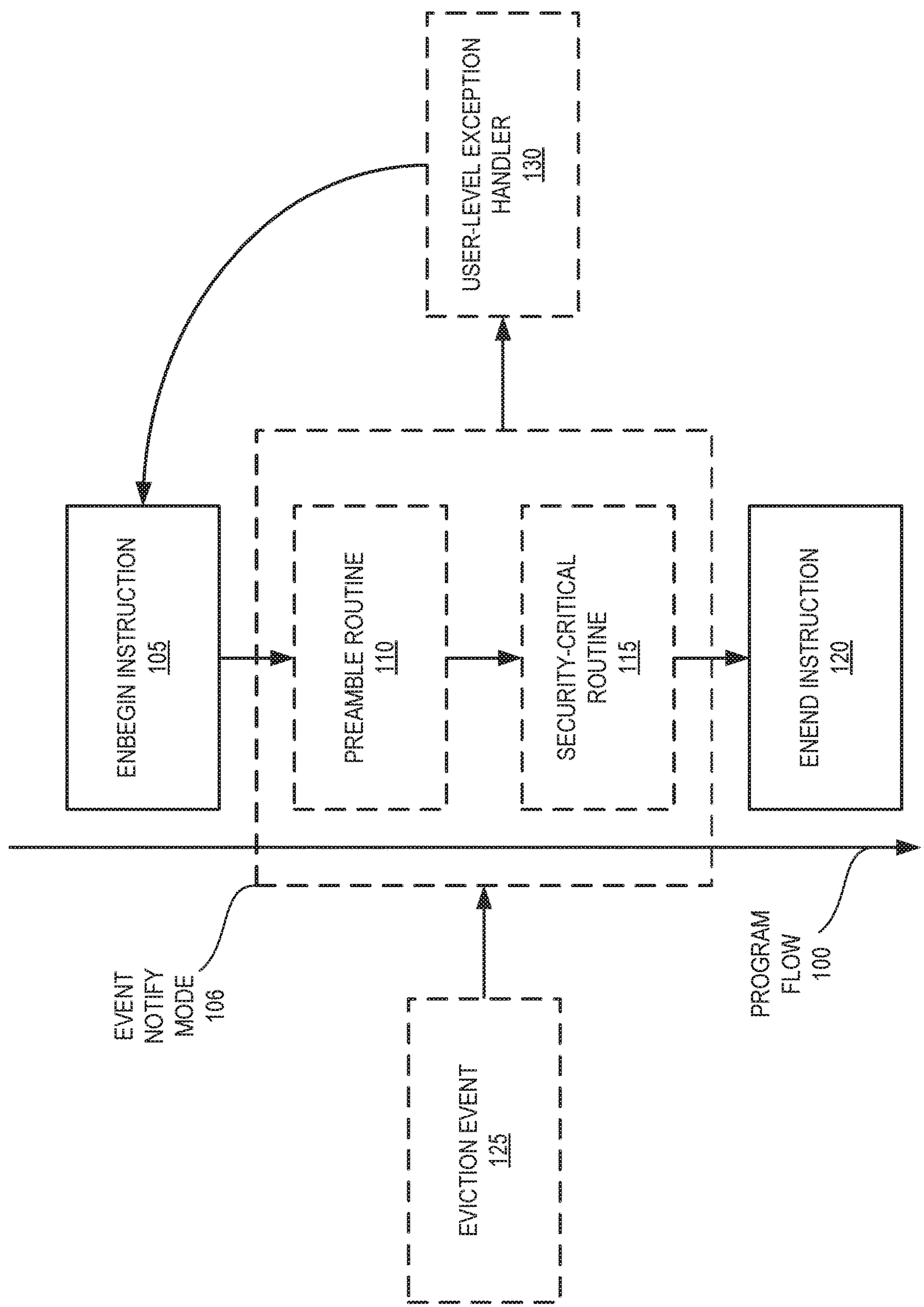
FIG. 1 illustrates a high-level view of side-channel attack mitigation according to some embodiments.

FIG. 1 illustrates a high-level view of side-channel attack mitigation according to some embodiments. As illustrated, a program flow 100 of a user-level application includes an ENBEGIN instruction 105, a preamble routine 110, a security-critical routine 115, and an ENEND instruction 120. In this usage, the dashing of the preamble routine 110 and the security-critical routine 115 indicate that they are specific to the user-level application and may vary from one application to another. The preamble routine 110 and the security-critical routine 115 include instructions related to the user-level application being protected. Protection entails the processor executing the application entering an event-notify mode 106. A user-level application can instruct the processor to enter the event-notify mode 106 to proactively protect secret information from side-channel attacks. In particular, the user-level application wraps the preamble routine 110 and the security-critical routine 115 with the ENBEGIN instruction 105 and the ENEND instruction 120. Note that although FIG. 1 illustrates the ENBEGIN instruction 105 as separate from the preamble routine 110, in some embodiments, the ENBEGIN instruction is included early in the preamble routine 110.

Before the processor executes the security-critical code 115, the preamble code 110 causes the processor to load all security-critical code and/or data into cache(s) and/or TLB(s). Absent an eviction event 125 during the event-notify mode 106, the processor executes the preamble routine 110, the security critical routine 115, and then exits the event-notify mode 106 upon executing the ENEND instruction.

If an eviction event 125 occurs while the processor is processing instructions in event-notify mode 106, the processor raises an exception to redirect the user-level application flow to a user-level exception handler 130. Again, the dashing of the user-level exception handler 130 indicates that it is specific to the user-level application and may vary from one application to another. When the redirection occurs, the processor exits the event-notify mode. Once in the user-level exception handler, the software program can implement a variety of side-channel mitigation measures. One example of such a mitigation measure is for the user-level exception handler to issue an ENBEGIN instruction 105 and then calling the preamble routine 110 (as illustrated) or calling the preamble routine 110 (if the preamble routine includes the ENBEGIN instruction 105). The preamble routine 110 causes the processor to reload the security-critical code and/or data into cache(s) and/or TLB(s). In this manner, the user-level exception handler 130 and preamble routine 110 effectively "pin" the code and/or data in the cache(s)/TLB(s). Because a pre-condition of a successful page fault- or cache-based side-channel attack is causing evictions or monitoring evictions, an attacker cannot observe or manipulate the security-critical code and/or data. Furthermore, since the security critical code and/or data is pre-loaded into the cache(s)/TLB(s), an attacker cannot obtain information based on a victim's execution or cache footprint before and after execution.

Exemplary Core Architecture

Figure 2A:
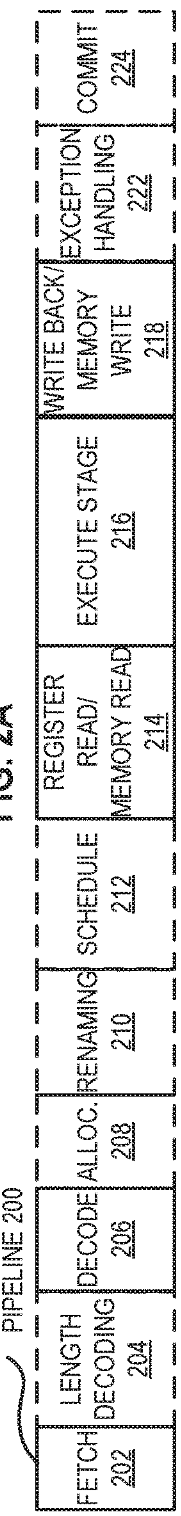
FIGS. 2A-2B illustrate an embodiment of hardware to process instructions to support side-channel attack mitigation.
Figure 2B:
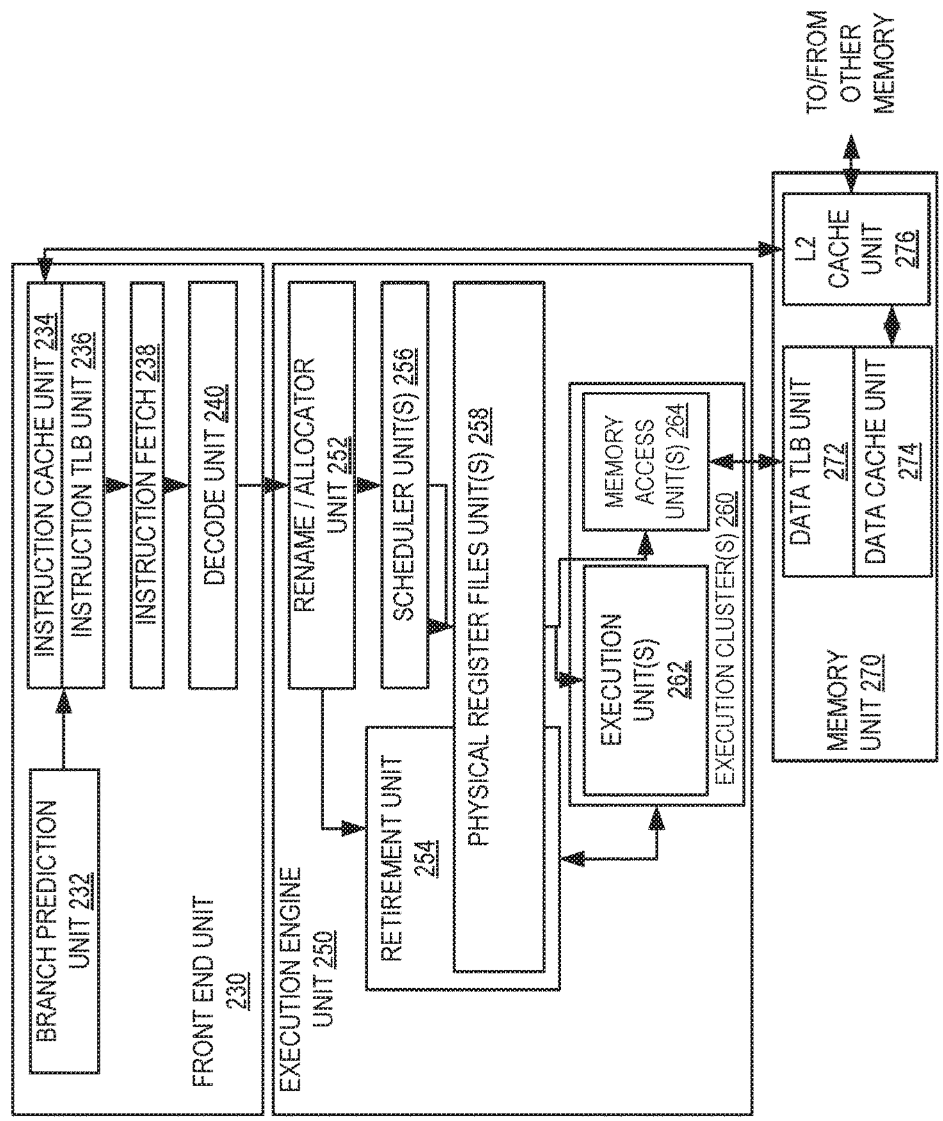

FIGS. 2A-2B illustrate an embodiment of hardware to process instructions to support side-channel attack mitigation. In particular, FIG. 2A is a block diagram illustrating both an exemplary in-order pipeline and an exemplary register renaming, out-of-order issue/execution pipeline according to embodiments of the invention. FIG. 2B is a block diagram illustrating both an exemplary embodiment of an in-order architecture core and an exemplary register renaming, out-of-order issue/execution architecture core to be included in a processor according to embodiments of the invention. The solid lined boxes in FIGS. 2A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

FIG. 2B shows processor core 290 including a front end unit 230 coupled to an execution engine unit 250, and both are coupled to a memory unit 270. The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, coprocessor core, general-purpose computing graphics processing unit (GPGPU) core, graphics core, or the like.

The front end unit 230 includes a branch prediction unit 232 coupled to an instruction cache unit 234, which is coupled to an instruction TLB 236, which is coupled to an instruction fetch unit 238, which is coupled to a decode unit 240. The decode unit 240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 290 includes a microcode ROM or other medium that stores microcode for certain macroinstructions (e.g., in decode unit 240 or otherwise within the front end unit 230). The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 258 comprises a vector registers unit, a write mask registers unit, and a scalar registers unit. These register units may provide architectural vector registers, vector mask registers, and general-purpose registers. The physical register file(s) unit(s) 258 is overlapped by the retirement unit 254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 254 and the physical register file(s) unit(s) 258 are coupled to the execution cluster(s) 260. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The instruction cache unit 234 is further coupled to a level 2 (L2) cache unit 276 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 238 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The core 290 raises the user-level exception handler whenever certain events that might be associated with an attack might occur ("security-critical events") during the event-notify mode. Exemplary security-critical events include eviction of entries in the data TLB unit 272, the data cache unit 274, the instruction cache unit 234, or the instruction TLB 236. In addition, the core 290 raises the user-level exception handler in response to other security-critical events such as an external interrupt or exception.

Several features of the core 290 support event-notify mode, including one or more registers, entry-level tracking of cache or TLB entries impacted by security-critical events (described with reference to FIGS. 3A-3D and 4A-4B), and the addition of instructions including ENBEGIN and ENEND (described with reference to FIG. 5). With regard to register-support, the core 290 includes one or more registers to support the flow and status of the event-notify mode. In an exemplary embodiment, each thread supported by the the core 290 includes an event-notify status flag in a register, a user-level exception handler pointer (EIP) register, and a current instruction pointer (CIP) register. The event-notify status flag indicates whether the core 290 is operating in event-notify mode for the thread. The CIP register stores the instruction pointer (IP) of the program flow when a security-critical event occurs. The EIP register stores the location of the user-level exception handler that the core 290 redirects program flow to after occurrence of a security-critical event.

The event-notify status flag and the EIP register need not be saved during a context-switch. When a security-critical event occurs, the core 290 uses the information in the EIP register prior to any context-switch, and the event-notify status flag can be cleared without saving as the core 290 exits the event-notify mode upon occurrence of a security-critical event.

FIGS. 3A-3D and 4A-4B illustrate an exemplary instruction TLB unit 236, an exemplary data TLB unit 272, an exemplary instruction cache unit 234, and an exemplary data cache unit 274. At a high-level, an entry in a cache or TLB includes a per-thread tracking bit that indicates whether the entry is tracked in the event-notify mode. Rather than redirect program flow to the user-level exception handler 120 on any cache eviction, the tracking or "T" bits allow the core 290 to redirect program flow only when an eviction of security-critical code or data occurs. The T-bits can be set or cleared independently for each hardware thread even if multiple threads share code or data and access the shared code/data in the event-notify mode. In an exemplary embodiment, an access of an entry in a TLB or cache while operating in the event-notify mode brings the data into tracked state. In other words, if the program flow (e.g., preamble routine 110 and security critical code 115) cause a memory access that hits within the cache or TLB, the core 290 (e.g., logic controlling the cache or TLB) sets the T-bit of the associated entry for the thread associated with the access. Further, if the program flow causes a memory access that misses the cache or TLB and results in retrieval of data from another memory, the core 290 sets the T-bit of the cache/TLB entry in which the retrieved data is stored. In some embodiments, as described below, a mask value may enable or disable eviction tracking for a particular cache and/or TLB, thereby preventing the T-bit from being set in the masked cache(s)/TLB(s).

Figures 4A, 4B:
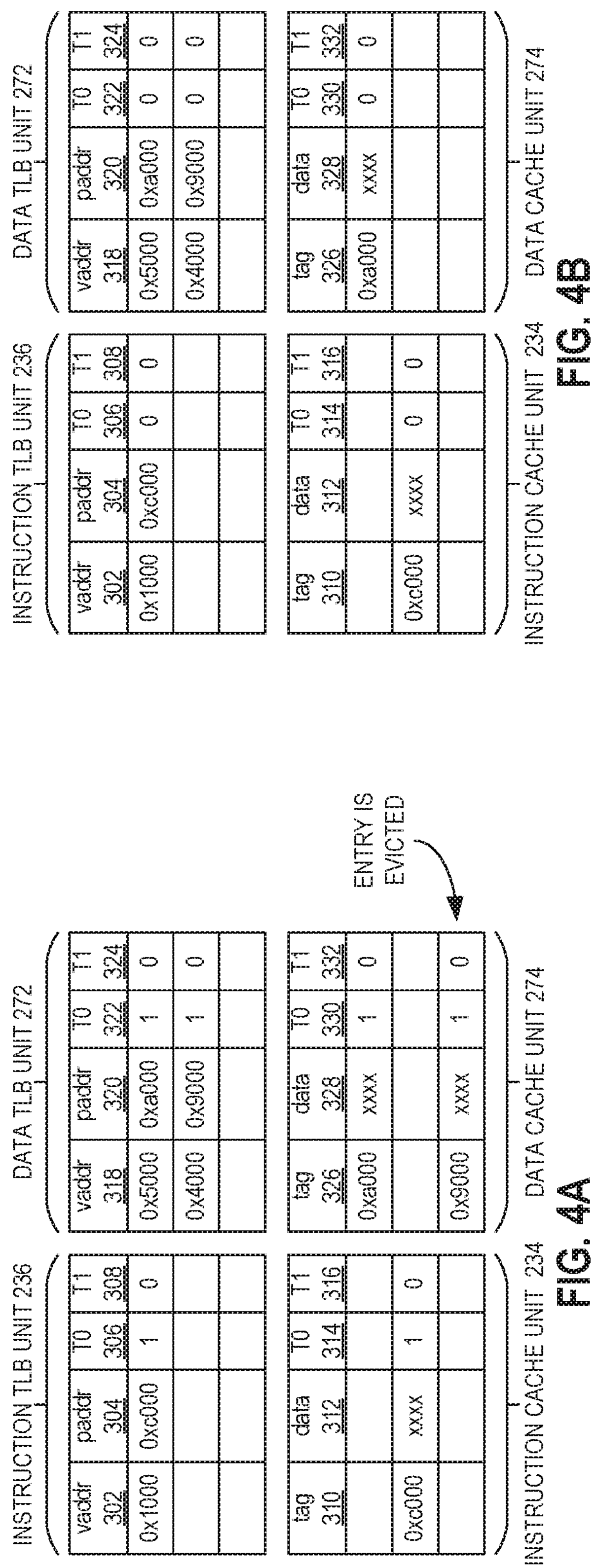
FIGS. 4A-4B illustrate an exemplary data cache unit, an exemplary instruction cache unit, an exemplary instruction translation lookaside buffer unit, and an exemplary data translation lookaside buffer before and after an eviction event.

FIGS. 3A-3D illustrate the state of the instruction TLB unit 236, the data TLB unit 272, the instruction cache unit 234, and the data cache unit 274 during execution of the exemplary set of instructions illustrated in Table 1. FIGS. 4A-4B illustrate the state of the caches and TLBs before and after an eviction. As illustrated in each of FIGS. 3A-3D and 4A-4B, and assuming a two-thread core 290: each entry in the instruction TLB unit 236 includes a virtual address 302, a physical address 304, a first thread T-bit ("T0") 306, and a second thread T-bit ("T1") 308; each entry in the data TLB unit 272 includes a virtual address 318, a physical address 320, a first thread T-bit ("T0") 322, and a second thread T-bit ("T1") 324; each entry in the instruction cache unit 234 includes a tag 310, data 312, a first thread T-bit ("T0") 314, and a second thread T-bit ("T1") 316; and each entry in the data cache unit 274 includes a tag 326, data 328, a first thread T-bit ("T0") 330, and a second thread T-bit ("T1") 330.

Table 1 contains an exemplary sequence of instructions that update the state of the caches and TLBs in FIGS. 3A-3D. In this example, the instructions are part of a first thread, T0, and any pipelining is ignored.

TABLE 1

Exemplary Instructions for FIGS. 3A-3D

| Number | Instruction | Program Counter | Accessed Memory Address for Data Operations | Cache/ TLB State After Execution |
|---|---|---|---|---|
| 1 | ENBEGIN | 0x1000 | | FIG. 3A |
| 2 | mov (% rsi), % rax | 0x1004 | 0x4000 | FIG. 3B |
| 3 | mov 4(% rsi), % rbx | 0x1008 | 0x5000 | FIG. 3C |
| 4 | ENEND | 0x100c | | FIG. 3D |

FIG. 3A illustrates the state of the TLBs 236, 272 and the caches 234, 275 after the processor executes the first instruction. Initially, the core 290 is processing the program and the program counter proceeds to a memory location that includes the ENBEGIN instruction. The core 290 fetches the instruction from memory resulting in updates to the instruction TLB unit 236 and the instruction cache unit 234. In this example, the instruction TLB unit 236 is updated with an entry having a virtual address 302 of 0x1000 and a physical address 304 of 0xc000 and the instruction cache unit 234 is updated with an entry having a tag 310 of 0xc000 and a data value that includes instructions beginning at virtual address 0x1000. Further, the T-bits 306, 308, 314, and 316 of the new entries for the first and second thread remain '0' as the core 290 has yet to enter event-notify mode. Because the instruction does not involve data, the data TLB unit 272 and the data cache unit 274 remain unchanged.

FIG. 3B illustrates the state of the TLBs 236, 272 and the caches 234, 275 after the processor executes the second instruction. The second instruction is a data move (MOV) instruction which causes the core 290 to move data from the memory location specified in the register rsi (e.g., 0x4000) to the register rax. Assuming the second instruction was cached via the instruction TLB unit 236 and instruction cache unit 234 as part of the ENBEGIN instruction, there is an instruction hit, and the T-bits 306, 314 for the respective cache entries in the in the instruction TLB unit 236 and instruction cache unit 234 are set. Further, in response to the MOV instruction, the core 290 reads the data from memory resulting in updates to the data TLB unit 272 and the data cache unit 274. In this example, the data TLB unit 272 is updated with an entry having a virtual address 318 of 0x4000 and a physical address 320 of 0x9000 and the data cache unit 274 is updated with an entry having a tag 310 of 0x9000 and the data read from memory. Further, because these memory accesses occurred within the event-notify mode, the T-bits 322 and 330 corresponding to the new entries are set.

FIG. 3C illustrates the state of the TLBs 236, 272 and the caches 234, 275 after the processor executes the third instruction. The third instruction is a move (MOV) instruction which causes the core 290 to move data from a memory location (0x5000) offset from the memory location specified in the register rsi to the register rbx. Assuming the third instruction was cached via the instruction TLB unit 236 and instruction cache unit 234 as part of the ENBEGIN instruction, the core 290 reads the data from memory resulting in updates to the data TLB unit 272 and the data cache unit 274. In this example, the data TLB unit 272 is updated with an entry having a virtual address 318 of 0x5000 and a physical address 320 of 0xa000 and the data cache unit 274 is updated with an entry having a tag 310 of 0xa000 and the data read from memory. Further, because these memory accesses occurred within the event-notify mode, the T-bits 322 and 330 corresponding to the new entries are set.

FIG. 3D illustrates the state of the TLBs 236, 272 and the caches 234, 275 after the processor executes the fourth instruction. The fourth instruction the ENEND instruction. When the core 290 processes the ENEND instruction, it clears (or causes logic associated with the cache(s)/TLB(s) to clear) all of the set T-bits along with other operations (e.g., clearing the event-notify status flag).

FIGS. 4A-4B illustrate the state of the instruction TLB unit 236, the data TLB unit 272, the instruction cache unit 234, and the data cache unit 274 before and after a security-critical event, such as a cache eviction. Again assuming a two-thread core 290: each entry in the instruction TLB unit 236 includes a virtual address 302, a physical address 304, a first thread T-bit ("T0") 306, and a second thread T-bit ("T1") 308; each entry in the data TLB unit 272 includes a virtual address 318, a physical address 320, a first thread T-bit ("T0") 322, and a second thread T-bit ("T1") 324; each entry in the instruction cache unit 234 includes a tag 310, data 312, a first thread T-bit ("T0") 314, and a second thread T-bit ("T1") 316; and each entry in the data cache unit 274 includes a tag 326, data 328, a first thread T-bit ("T0") 330, and a second thread T-bit ("T1") 330.

FIG. 4A illustrates the state of the TLBs 236, 272 and the caches 234, 275 at some point in time, e.g., after executing the first three instructions in Table 1. If a security-critical event occurs prior to exiting the event-notify mode, the core 290 clears (or causes logic associated with the cache(s)/TLB(s) to clear all of the set T-bits along with other operations (e.g., clearing the event-notify status flag), as was the case with the ENEND instruction described above with reference to FIG. 3D. The state after clearing T-bits is illustrated in FIG. 4B. In addition to clearing T-bits, the core 290 performs additional operations such as redirecting program flow for any threads that have a set T-bit for the cache/TLB entry associated with the security-critical event. Additional detail regarding these operations is found below with reference to FIG. 11. In the example illustrated between FIGS. 4A and 4B, the evicted entry in the data cache unit 274 has a set T-bit for the first thread, so the core 290 would cause the program flow of the associated program executing within the first thread to redirect to the user-level exception handler.

Exemplary Instructions

Figure 5:
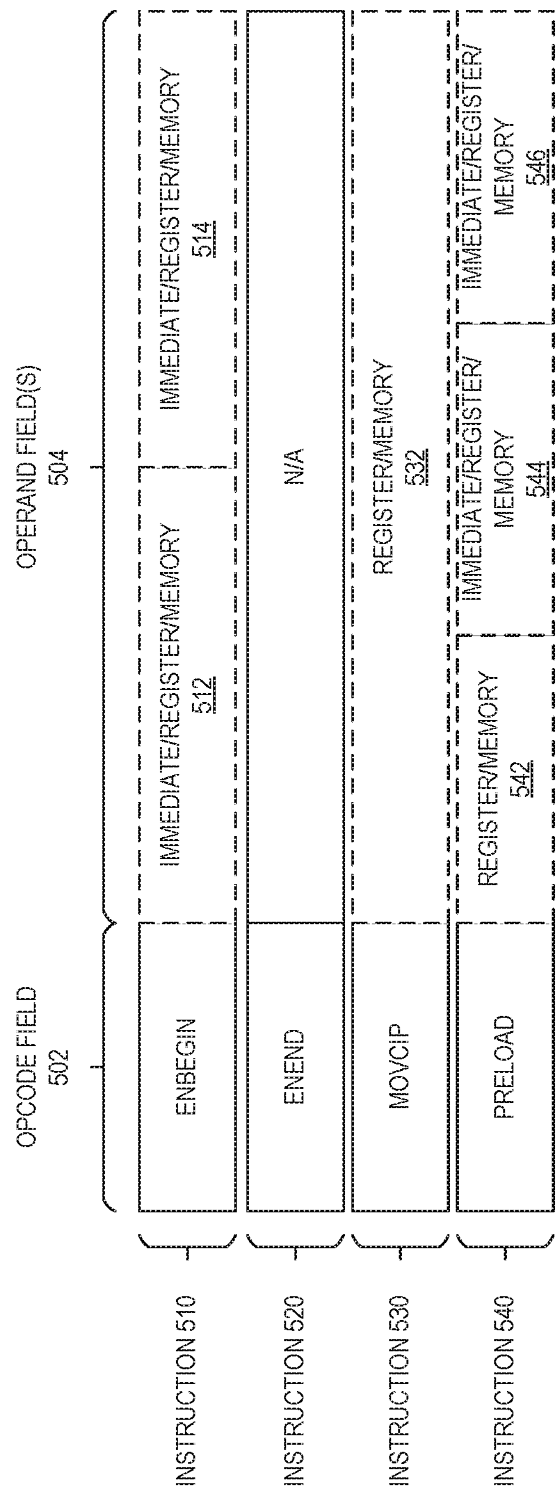
FIG. 5 illustrates embodiments of an ENBEGIN instruction, an ENEND instruction, a MOVCIP instruction, and a PRELOAD instruction.

FIG. 5 illustrates embodiments of an ENBEGIN instruction 510, an ENEND instruction 520, a MOVCIP instruction 530, and a PRELOAD instruction 540. The ENBEGIN instruction 510 includes an operation code (OPCODE) field 502 that includes a value that decode circuitry can use to identify the ENBEGIN instruction 510. An immediate, register, or memory location operand 512 includes or identifies the entry-point (i.e., a memory address) of the user-level exception handler. In some embodiments, the ENBEGIN instruction 540 also includes an immediate, register, or memory location operand 514 that includes or identifies a value that enables or disables (e.g., mask) security-critical events based on the affected cache or TLB. For example, the operand 514 may be a 4-bit value where each bit indicates whether to monitor for security-critical events in the instruction TLB unit 236, the data TLB unit 272, the instruction cache unit 234, and the data cache unit 274, respectively. In some embodiments, one or both of the operands 512 or 514 may be omitted and their respective contents located in implicit register(s) associated with the ENBEGIN instruction 510. Upon executing the ENBEGIN instruction 510, execution circuitry places the core 290 in event-notify mode by setting the event-notify status flag and loads the location of the entry-point of the user-level exception handler in the EIP register.

The ENEND instruction 520 includes an opcode field 502 that includes a value that decode circuitry can use to identify the ENEND instruction 520. Upon executing the ENEND instruction 520, execution circuitry removes the core 290 from event-notify mode by clearing the event-notify status flag and clearing any set T-bits in the cache(s)/TLB(s) or causing any set T-bits to be cleared.

The MOVCIP instruction 530 includes an opcode field 502 that includes a value that decode circuitry can use to identify the MOVCIP instruction 530. The MOVCIP instruction 530 allows a software program to store the value in the CIP register. In some embodiments, the MOVCIP instruction 530 includes a register or memory location operand 532 that identifies the location where the value in the CIP should be stored. Upon executing the MOVCIP instruction with operand 532, execution circuitry stores the value in the CIP register in the identified location. In some embodiments, the MOVCIP instruction 530 includes no operands, and upon executing the MOVCIP instruction 530, execution circuitry pushes the contents of the CIP register onto a stack for the software program. As described elsewhere herein, the user-level exception handler can use the MOVCIP instruction 530 to store the location of the main flow of the software program so that it can be resumed after the core 290 redirects execution to the user-level exception handler when a security-critical event occurs in event-notify mode.

The PRELOAD instruction 540 includes an opcode field 502 that includes a value that decode circuitry can use to identify the PRELOAD instruction 540. The PRELOAD instruction 540 provides a simple way to preload code into the instruction cache unit 234 or data into the data cache unit 274. A register or memory location operand 542 includes or identifies a memory location of a data structure containing the data to be "pinned" into the cache. The data structure may correspond to the format of entries in the instruction cache unit 234 or the data cache unit 274. An immediate, register, or memory location operand 544 includes or identifies whether the data structure is loaded into the instruction cache unit 234 or into the data cache unit 274. For example, a "1" might indicate that the data structure is to be loaded into the instruction cache unit 234 and a "0" might indicate that the data structure is to be loaded into the data cache unit 274. An immediate, register, or memory location operand 546 includes or identifies permissions associated with the cached entries (e.g., a "1" indicates read-only while a "0" indicates read or write permission). In some embodiments, one or more of operands 542, 544, and 546 may be omitted and their respective contents located in implicit register(s) associated with the PRELOAD instruction 540. For example, RAX might store a value associated with the description of operand 542, RBX might store a value associated with the description of operand 544, and RCX might store a value associated with the description of operand 546. Upon executing the PRELOAD instruction 540, execution circuitry loads the data in the data structure from memory into the designated instruction cache unit or the data cache unit with the identified permissions.

Figure 6:
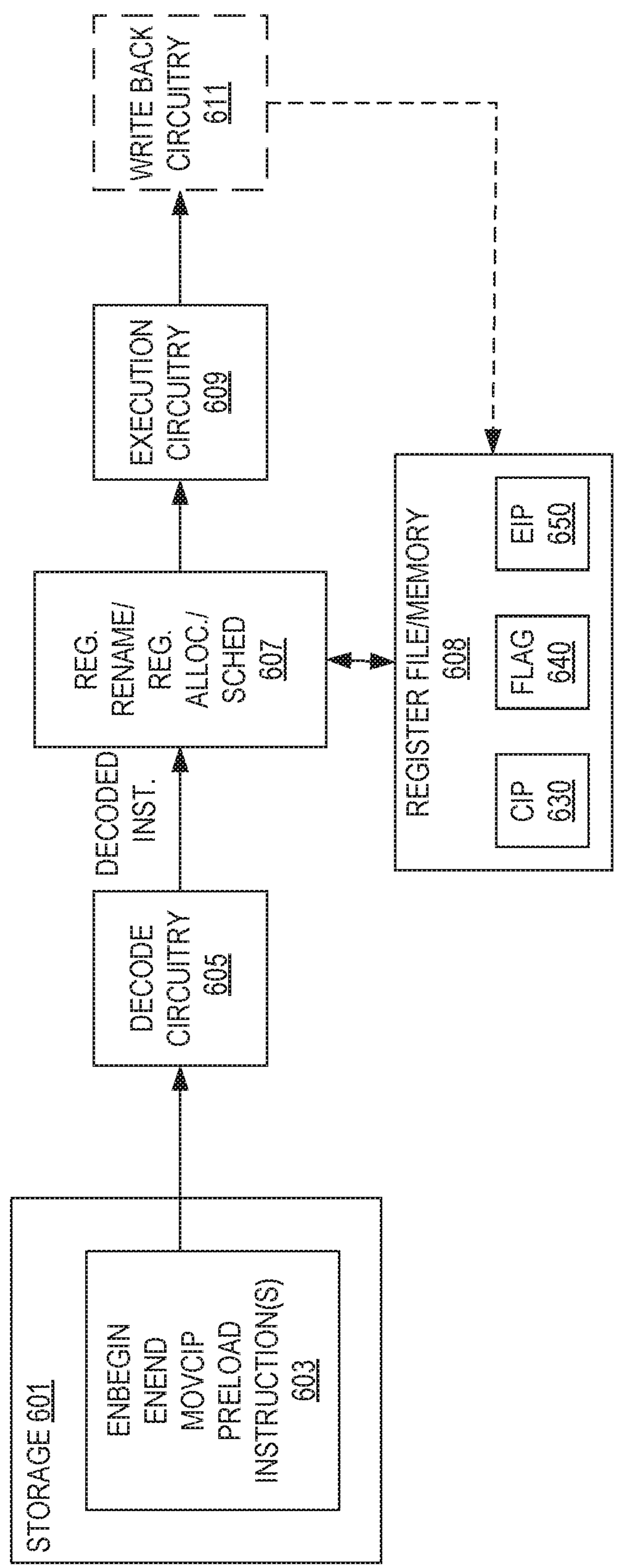
FIG. 6 illustrates an embodiment of hardware to process the exemplary instructions illustrated in FIG. 5.

FIG. 6 illustrates an embodiment of hardware to process the exemplary instructions illustrated in FIG. 5. As illustrated, storage 601 stores instruction(s) 603 to be executed, including an ENBEGIN instruction, an ENEND instruction, a MOVCIP instruction, and a PRELOAD instruction. The instruction is received by decode circuitry 605. For example, the decode circuitry 605 receives this instruction from fetch logic/circuitry. Decode circuitry 605 may correspond to the decode unit 240 in FIG. 2, and the fetch logic/circuitry may correspond to the instruction fetch unit 238 in FIG. 2.

As illustrated in FIG. 5, the instructions 603 include a field for an opcode and zero or more operands, depending on the instruction 603. The decode circuitry 605 decodes the instruction into one or more operations. In some embodiments, this decoding includes generating a plurality of micro-operations to be performed by execution circuitry (such as the execution engine unit 250 in FIG. 2). For example, the decode circuitry 605 may break a preload operation into multiple memory read operations based on a known size of the data structure being loaded into the instruction cache unit 234 or the data cache unit 274.

In some embodiments, register renaming, register allocation, and/or scheduling circuitry 607 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments). Registers (register file) and/or memory 608 store data as operands of the instruction to be operated on by execution circuitry, including the above-described CIP register 630, EIP register 640, and register including the event-notify status flag 650. Exemplary register types include packed data registers, general-purpose registers, and floating-point registers.

Execution circuitry executes 609 the decoded instruction. The execution of the decoded instruction causes the execution circuitry to perform operations based on the decoded instruction, as detailed below with reference to FIGS. 7-10.

Write back (retirement) circuitry 611 commits the result of the execution of the decoded instruction (if any). In some embodiments, retirement/write back circuitry architecturally commits the destination register into the registers or memory and retires the instruction.

Figure 7:
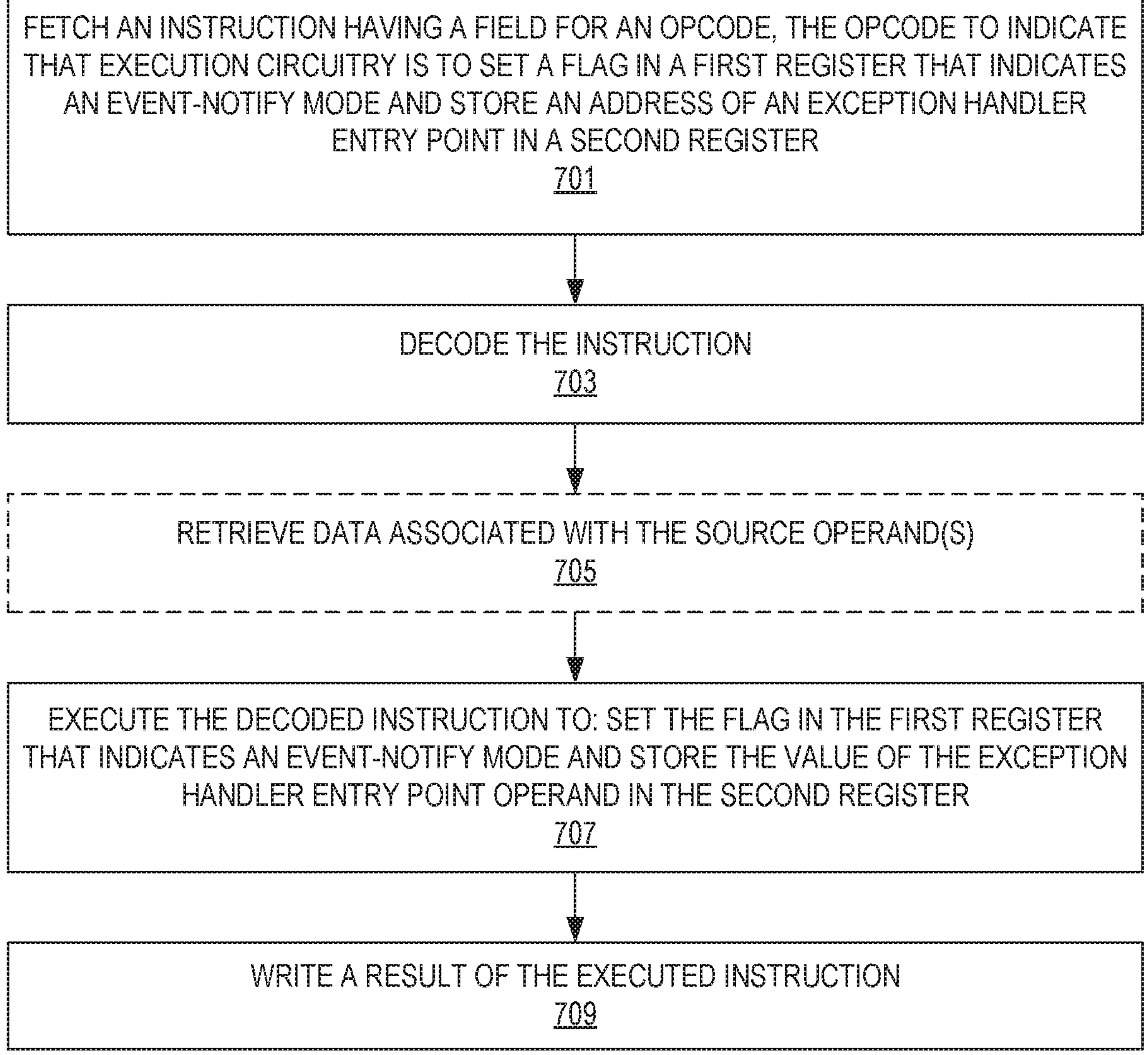
FIG. 7 illustrates an embodiment of method performed by a processor to process a ENBEGIN instruction.

FIG. 7 illustrates an embodiment of method performed by a processor to process a ENBEGIN instruction. For example, the stages of the pipeline 200 in FIG. 2A, the core 290 of FIG. 2B, or the hardware illustrated in FIG. 6 perform this method.

At 701, an instruction is fetched. For example, a ENBEGIN instruction is fetched by the fetch stage 202 or the instruction fetch unit 238. As described above with reference to FIG. 5, the ENBEGIN instruction includes a field for an opcode, the opcode to indicate that execution circuitry is to set a flag in a first register that indicates an event-notify mode and to store the exception handler entry point operand in a second register. The ENBEGIN instruction may include an explicit operand or be associated with an implicit operand that identifies an exception handler entry point. The ENBEGIN instruction may further include an explicit operand or be associated with an implicit operand that identifies which cache(s) or TLB(s) should trigger redirection to the exception handler upon the occurrence of a security-critical event.

At 703, the fetched instruction is decoded. For example, the fetched ENBEGIN instruction is decoded by the decode stage 206, the decode unit 240, or the decode circuitry 605.

At 705, data values associated with the explicit or implicit operands of the decoded instruction are retrieved. For example, if the implicit or explicit operand(s) include a reference to a register or a memory location that contains the entry-point address of the user-level exception handler, the entry-point address is retrieved.

At 707, the decoded instruction is executed by execution circuitry such as the execution stage 216, the execution engine unit 250 (e.g., an execution unit 262), or execution circuitry 609. For the ENBEGIN instruction, the execution will cause execution circuitry to set the event-notify status flag in a register to indicate that the core 290 is in event-notify mode and to store the address of the user-level exception handler in the second register (e.g., the EIP register, described above).

At 709, the result of the executed instruction is written. For example, the write back/memory write stage 218, memory access unit(s) 264, execution unit(s) 262, or write back circuitry 611 sets the event-notify status flag in the register 640 and writes the address of the user-level exception handler to the EIP register 650.

Figure 8:
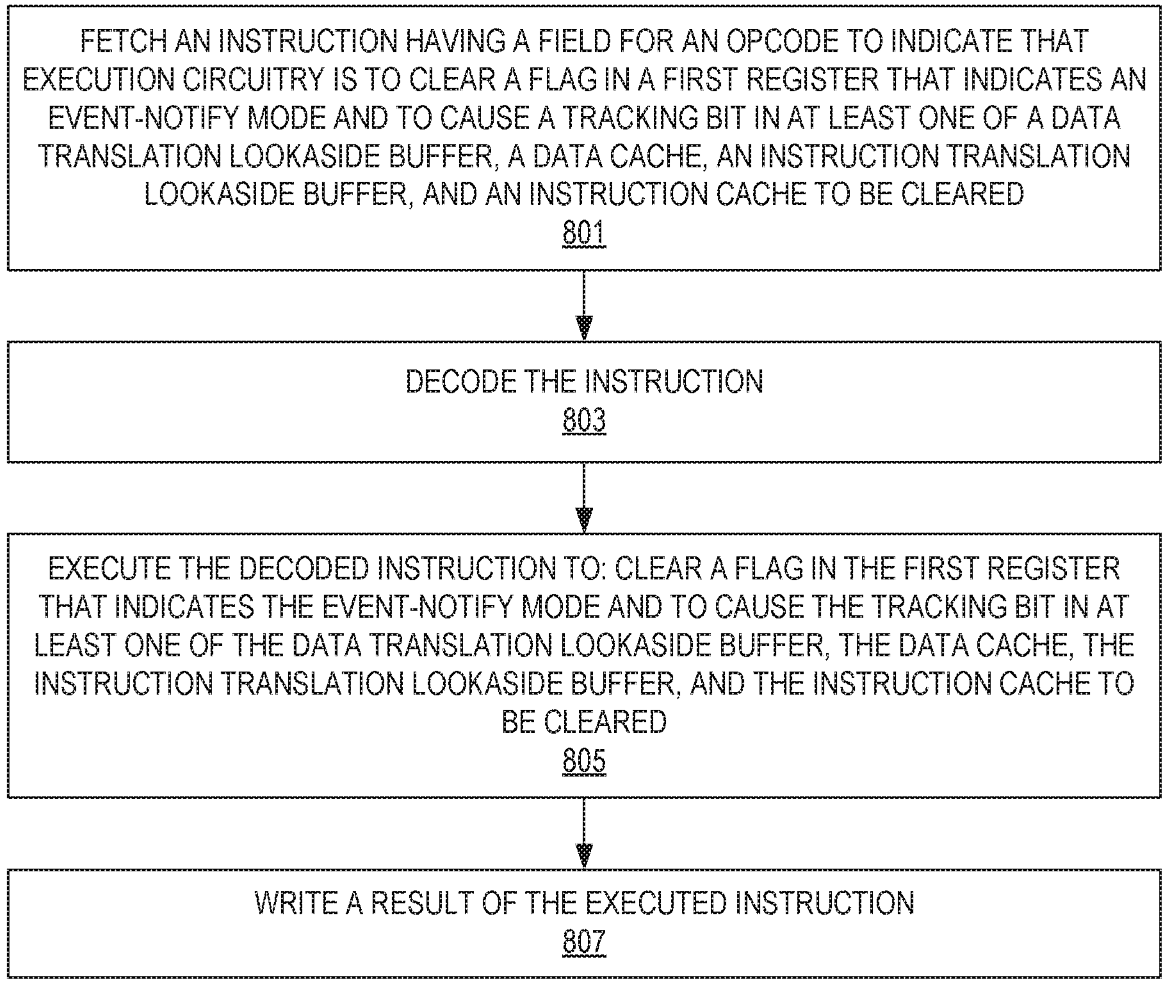
FIG. 8 illustrates an embodiment of method performed by a processor to process a ENEND instruction.

FIG. 8 illustrates an embodiment of method performed by a processor to process a ENEND instruction. For example, the stages of the pipeline 200 in FIG. 2A, the core 290 of FIG. 2B, or the hardware illustrated in FIG. 6 perform this method.

At 801, an instruction is fetched. For example, a ENEND instruction is fetched by the fetch stage 202 or the instruction fetch unit 238. As described above with reference to FIG. 5, the ENEND instruction includes a field for an opcode, the opcode to indicate that execution circuitry is to clear a flag in a first register that indicates an event-notify mode and to cause a tracking bit in at least one of a data TLB, a data cache, an instruction TLB, and an instruction cache to be cleared. For example, if operand 514 masked eviction events in the instruction TLB and instruction cache, the opcode may cause only T-bits in the data TLB and data cache to be cleared. In some embodiments, all the T-bits in the TLBs and caches are cleared upon exiting the event-notify mode.

At 803, the fetched instruction is decoded. For example, the fetched ENEND instruction is decoded by the decode stage 206, the decode unit 240, or the decode circuitry 605.

At 805, the decoded instruction is executed by execution circuitry such as the execution stage 216, the execution engine unit 250 (e.g., an execution unit 262), or execution circuitry 609. For the ENEND instruction, the execution will cause execution circuitry to clear a flag in the first register that indicates the event-notify mode (e.g., the event-notify status flag). The execution will further cause the T-bit in at least one of the data TLB, the data cache, the instruction TLB, and the instruction cache to be cleared. For example, the execution will cause the execution circuitry to reset or overwrite T-bits in the cache(s) or TLB(s), or cause logic associated with the cache(s) or TLB(s) to reset or overwrite the T-bits.

At 807, the result of the executed instruction is written. For example, the wlrite back/memory write stage 218, memory access unit(s) 264, execution unit(s) 262, or write back circuitry 611 clears the event-notify status flag in the register 640.

Figure 9:
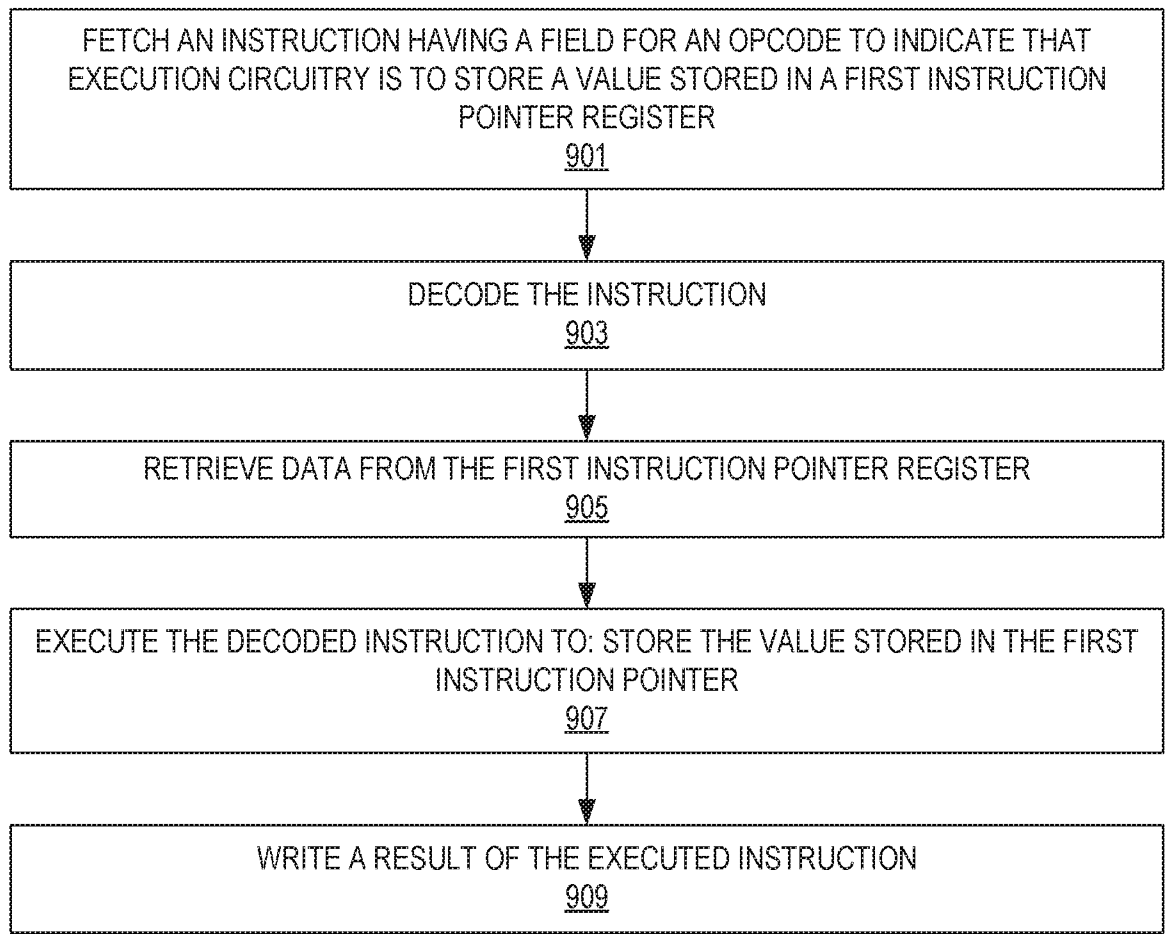
FIG. 9 illustrates an embodiment of method performed by a processor to process a MOVCIP instruction.

FIG. 9 illustrates an embodiment of method performed by a processor to process a MOVCIP instruction. For example, the stages of the pipeline 200 in FIG. 2A, the core 290 of FIG. 2B, or the hardware illustrated in FIG. 6 perform this method.

At 901, an instruction is fetched. For example, a MOVCIP instruction is fetched by the fetch stage 202 or the instruction fetch unit 238. As described above with reference to FIG. 5, the MOVCIP instruction includes a field for an opcode, the opcode to indicate that execution circuitry is to store a value stored in a first instruction pointer register (e.g., the CIP register 630). In some embodiments, the MOVCIP instruction further includes a register or memory location operand that identifies the location where the value in the first instruction pointer register should be stored. In other embodiments where the MOVCIP instruction does not include an operand, the instruction indicates that execution circuitry is to store the value in the first instruction pointer register onto a stack in a memory.

At 903, the fetched instruction is decoded. For example, the fetched ENEND instruction is decoded by the decode stage 206, the decode unit 240, or the decode circuitry 605.

At 905, data values associated with the decoded instruction are retrieved. In particular, the value of the first instruction pointer register (e.g., the CIP register 630) is retrieved.

At 907, the decoded instruction is executed by execution circuitry such as the execution stage 216, the execution engine unit 250 (e.g., an execution unit 262), or execution circuitry 609. For the MOVCIP instruction, the execution will cause execution circuitry to store the the value stored in the first instruction pointer register (e.g., the CIP register 640 as retrieved at 905) in the location identified by the operand (if the instruction includes an operand that identifies the location to store the pointer) or onto the stack in the memory (if the instruction does not include an operand identifying the location to store the pointer).

At 909, the result of the executed instruction is written. For example, the write back/memory write stage 218, memory access unit(s) 264, execution unit(s) 262, or write back circuitry 611 writes the value from the first instruction pointer register to the stack in memory or to the location specified by the operand (if present). For example, if the execution circuitry buffered the write at 907, the buffered operation is performed at 909.

Figure 10:
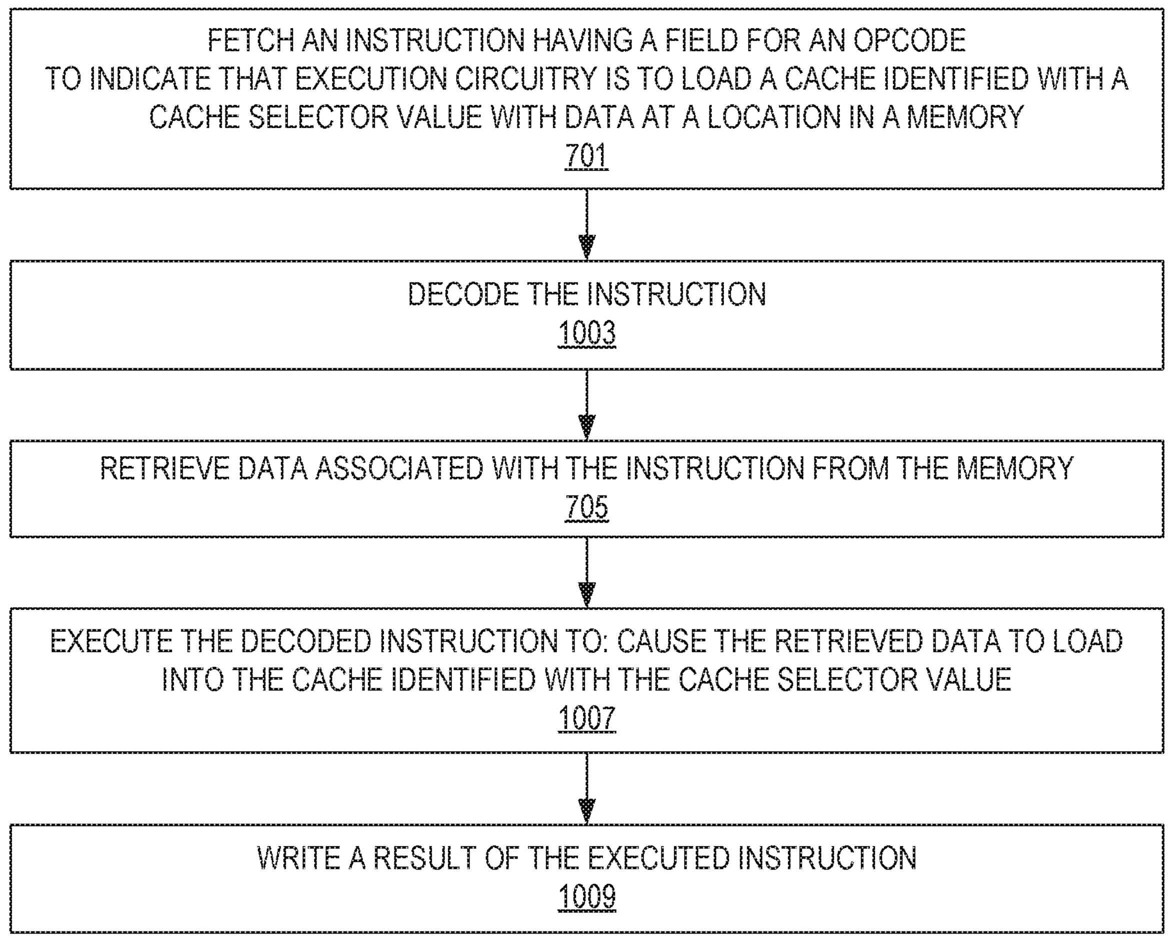
FIG. 10 illustrates an embodiment of method performed by a processor to process a PRELOAD instruction.

FIG. 10 illustrates an embodiment of method performed by a processor to process a PRELOAD instruction. For example, the stages of the pipeline 200 in FIG. 2A, the core 290 of FIG. 2B, or the hardware illustrated in FIG. 6 perform this method.

At 1001, an instruction is fetched. For example, a PRELOAD instruction is fetched by the fetch stage 202 or the instruction fetch unit 238. As described above with reference to FIG. 5, the PRELOAD instruction includes a field for an opcode, the opcode to indicate that execution circuitry is to indicate that execution circuitry is to load a cache identified with a cache selector value with data at a location in a memory. The PRELOAD instruction may include an explicit operand or be associated with an implicit operand that identifies the location of the data in the memory as described herein. The PRELOAD instruction may further include an explicit operand or be associated with an implicit operand that includes or identifies the cache selector value (e.g., whether the destination for the data in memory is an instruction cache or a data cache) as described herein. The PRELOAD instruction may further include an explicit operand or be associated with an implicit operand that includes or identifies the read/write permissions associated with the loaded cache entries as described herein.

At 1003, the fetched instruction is decoded. For example, the fetched PRELOAD instruction is decoded by the decode stage 206, the decode unit 240, or the decode circuitry 605.

At 1005, data values associated with the decoded instruction are retrieved. In particular, the data in the memory that is to be loaded into the identified cache (i.e., instruction or data) is retrieved. Further, if any of the operands are implicit operands, the data stored in the location of each implicit operand is retrieved (e.g., the read/write permission value; the value indicating whether the data from memory is loaded into the data or the instruction cache).

At 1007, the decoded instruction is executed by execution circuitry such as the execution stage 216, the execution engine unit 250 (e.g., an execution unit 262), or execution circuitry 609. For the PRELOAD instruction, the execution will cause execution circuitry to cause the retrieved data to load into the cache identified with the cache selector value. For example, the execution circuitry loads the data in the data cache or the instruction cache, as identified by the cache selector value, and subject to the read/write permissions, if specified.

At 1009, the result of the executed instruction is written. For example, the write back/memory write stage 218, memory access unit(s) 264, execution unit(s) 262, or write back circuitry 611 writes the data from the memory into the identified cache.

Figure 11:
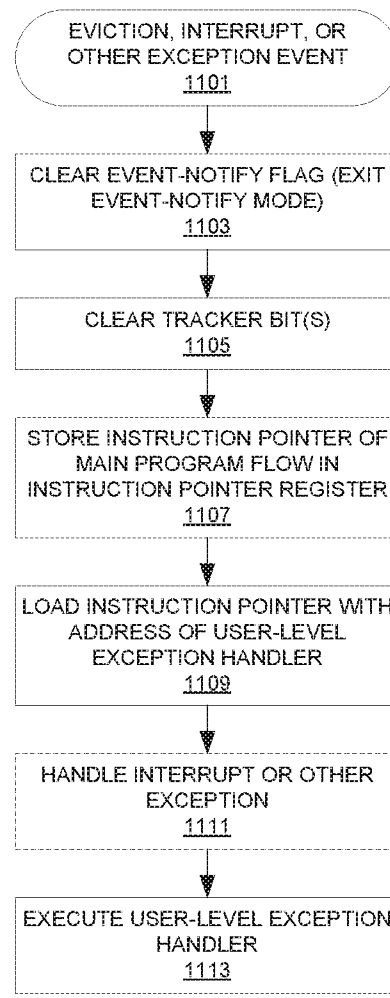
FIG. 11 illustrates an embodiment of method performed by a processor in response to an event that occurs while in an event-notify mode.

FIG. 11 illustrates an embodiment of method performed by a processor in response to an event that occurs while in the event-notify mode. For example, the stages of the pipeline 200 in FIG. 2A, the core 290 of FIG. 2B, the hardware illustrated in FIG. 6, and/or any microcode associated thereof (collectively, firmware/hardware) perform this method.

The method begins at 1101 upon the occurrence of a cache or TLB eviction, interrupt, or other security-critical event. For example, the method begins when the firmware/hardware is in the event-notify mode and identifies an eviction a cache or a TLB entry that has a set T-bit. Further, if the event-notify mode was enabled only for certain cache(s) or TLB(s), e.g., via operand 514, the method begins if all of the requisite conditions are satisfied (e.g., the core 290 is in event-notify mode, an eviction occurs of an entry with a set T-bit, the eviction is in a cache or TLB that is not masked).

At 1103, the firmware/hardware clears the event-notify status flag in the register to take the processor out of the event-notify mode. At 1105, the firmware/hardware clears the set T-bits in the cache(s) and/or TLB(s). At 1107, the firmware/hardware stores the instruction pointer of the software program flow in an instruction pointer register. For example, if the instruction pointer of the main software program flow was at 0x10F0 when the security-critical event occurred, the firmware/hardware writes the value 0x10F0 to the CIP register. At 1109, Once the instruction pointer of the software program flow is stored, the firmware/hardware loads the instruction pointer register (e.g., the program counter) with the entry-point of the user-level exception handler (e.g., the value stored in the EIP register) for the software program which will cause the software program to redirect its program flow to the exception handler. At 1111, the firmware/hardware (and any supporting software) handle the interrupt or other exception that was the trigger of the security-critical event (e.g., for external interrupts or exceptions). Once the firmware/hardware returns to the software program, the firmware/hardware begins execution of the software program at the user-level exception handler, as indicated at 1113. By storing the instruction pointer of the software program when the security-critical event occurs in the CIP register and loading the current instruction pointer with the EIP register, when the software program continues execution, the firmware/hardware redirects the execution to the user-level exception handler to allow the software program to defeat a possible side-channel attack.

Exemplary Program Flows

Various program flows can leverage the instructions and associated firmware/hardware features disclosed herein to protect security-critical code and/or data. The following examples illustrate a sequence of operations performed by software programs that include a preamble routine and a security-critical routine in conjunction with hardware and/or firmware to prevent leakage of security-critical code or data.

In a first example, a processor (e.g., the core 290) executes a software program without interruption by a security-critical event. In a main flow of the software program, the software program calls the preamble routine. The preamble routine includes an ENBEGIN instruction, followed by a PRELOAD instruction to preload an instruction or data cache. When the preamble routine completes (i.e., the cache is loaded), program flow returns to the main flow. In the main flow, the software program performs the security-critical processing (or calls a security-critical routine). Once the security-critical processing is complete, the software program issues the ENEND instruction.

In a second example, a processor (e.g., the core 290) executes a software program and a security-critical event occurs during the security-critical routine of the software program (e.g., during the security-critical routine 115). In this example, the security-critical event is a cache eviction of a tracked cache entry (e.g., with a T-bit). The software program flow calls the preamble routine, which includes the ENBEGIN instruction and performs the cache preloading with the PRELOAD instruction. The software program flow continues to the security-critical routine, during the processing of which an eviction of a tracked cache or TLB entry occurs. In response, the firmware/hardware clears the event-notify status flag, clears any set T-bits in the cache(s) and/or TLB(s), stores the instruction pointer of the software program in the CIP register, and loads the instruction pointer for the software program with the entry-point of the software program's user-level exception handler to redirect the program flow to the user-level exception handler. The user-level exception handler stores the value stored in the CIP register onto the program stack (e.g., in embodiments where the MOVCIP instruction does not include a location operand) or to an identified location (e.g., in embodiments where the MOVCIP does include a location operand). Storing the value stored in the CIP register allows the software program to resume its security-critical routine where it left off when the eviction occurred. The user-level exception then calls the preamble routine to "re-pin" the security-critical code and/or data in the cache(s). Before calling the preamble routine, the user-level exception handler may save any flags or other registers on the stack to enable the software program to resume the security-critical routine where it left off after the preamble returns. The preamble routine is executed, including re-initiating the event-notify mode by issuing the ENBEGIN instruction. Once the preamble routine completes, the software program flow returns to the user-level exception handler. The user-level exception handler restores and flags or registers it preserved before calling the preamble routine from the stack and redirects the program flow to the value of the preserved CIP register. In this manner, the software program resumes executing the security-critical routine having re-loaded the cache(s). Further, by re-loading the cache(s), any observer or attacker cannot ascertain any patterns in the security-critical routine based on cache fills/evictions.

In a third example, a processor (e.g., the core 290) executes a software program and a security-critical event occurs during the preamble routine of the software program (e.g., during the preamble routine 110). In this example, the security-critical event is a cache eviction of a tracked cache entry (e.g., with a T-bit). The software program flow calls the preamble routine, which includes the ENBEGIN instruction. In this example, the preamble routine begins cache preloading with the PRELOAD instruction. Prior to completing the cache preloading, an eviction of a tracked cache or TLB entry occurs. In response, the firmware/hardware clears the event-notify status flag, clears any set T-bits in the cache(s) and/or TLB(s), stores the instruction pointer of the software program in the CIP register, and loads the instruction pointer for the software program with the entry-point of the software program's user-level exception handler to redirect the program flow to the user-level exception handler. The user-level exception handler stores the value stored in the CIP register to the specified location (e.g., via an embodiment of the MOVCIP instruction that includes a location operand). The user-level exception then calls the preamble routine to "re-pin" the security-critical code and/or data in the cache(s). The preamble routine is executed, including re-initiating the event-notify mode by issuing the ENBEGIN instruction. The preamble routine can checkpoint its first execution and check whether it was previously interrupted based on the existence of a checkpoint. If the preamble routine determines it was interrupted, the preamble routine can revert the program flow to the checkpoint so that preamble routine is executed from the beginning to completion only once. After the preamble routine is executed, the program flow continues to the security-critical routine.

Note that a first security-critical event could occur within the security-critical routine and subsequently a second security-critical event could occur within the preamble routine that was initiated by the user-level exception handler that was handling the first security-critical event. In this case, the user-level exception handler called in response to the first event would call the MOVCIP instruction to store the instruction pointer of the security-critical program flow and subsequent calls to the user-level exception handler (e.g., from the preamble routine) would not. Once the preamble routine has completed once without interruption, the user-level exception handler called in response to the first event would issue a RET instruction to allow the software program to resume security-critical routine execution with the re-loaded cache(s). Again, by re-loading the cache(s), any observer or attacker cannot ascertain any patterns in the security-critical routine based on cache fills/evictions.

In a fourth example, a processor (e.g., the core 290) executes a software program and a security-critical event occurs during the security-critical routine of the software program. In this example, the security-critical event is an external interrupt. The software program flow calls the preamble routine, which includes the ENBEGIN instruction and performs the cache preloading with the PRELOAD instruction. The software program flow continues to the security-critical routine, during the processing of which an external interrupt occurs. In response, the firmware/hardware clears the event-notify status flag, clears any set T-bits in the cache(s) and/or TLB(s), stores the instruction pointer of the software program in the CIP register, and loads the instruction pointer for the software program with the entry-point of the software program's user-level exception handler to redirect the program flow to the user-level exception handler. After servicing the external interrupt, the program flow resumes with the user-level exception handler. The user-level exception handler stores the value stored in the CIP register onto the program stack (e.g., in embodiments where the MOVCIP instruction does not include a location operand) or to an identified location (e.g., in embodiments where the MOVCIP does include a location operand). Storing the value in the CIP register allows the software program to resume its security-critical routine where it left off when the interrupt occurred. The user-level exception then calls the preamble routine to "re-pin" the security-critical code and/or data in the cache(s). Before calling the preamble routine, the user-level exception handler may save any flags or other registers on the stack to enable the software program to resume the security-critical routine where it left off after the preamble returns. The preamble routine is executed, including re-initiating the event-notify mode by issuing the ENBEGIN instruction. Once the preamble routine completes, the software program flow returns to the user-level exception handler. The user-level exception handler restores and flags or registers it preserved before calling the preamble routine from the stack and redirects the program flow to the value of the preserved CIP register. In this manner, the software program resumes executing the security-critical routine. Again, by re-loading the cache(s), any observer or attacker cannot ascertain any patterns in the security-critical routine based on cache fills/evictions.

The side-channel protected mode can be implemented across a variety of different core and computer architectures, including in emulation environments, such as those illustrated and described with reference to FIGS. 12-18.

Additional Exemplary Core Architectures

Specific Exemplary in-Order Core Architecture

Figure 12B:
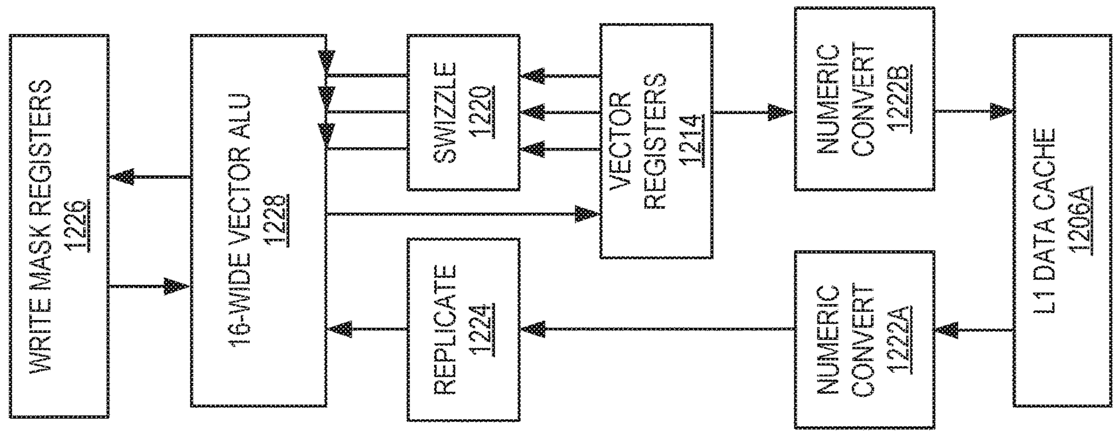
FIGS. 12A-B illustrate a block diagram of a more specific exemplary in-order core architecture, which core would be one of several logic blocks (including other cores of the same type and/or different types) in a chip.
Figure 12A:
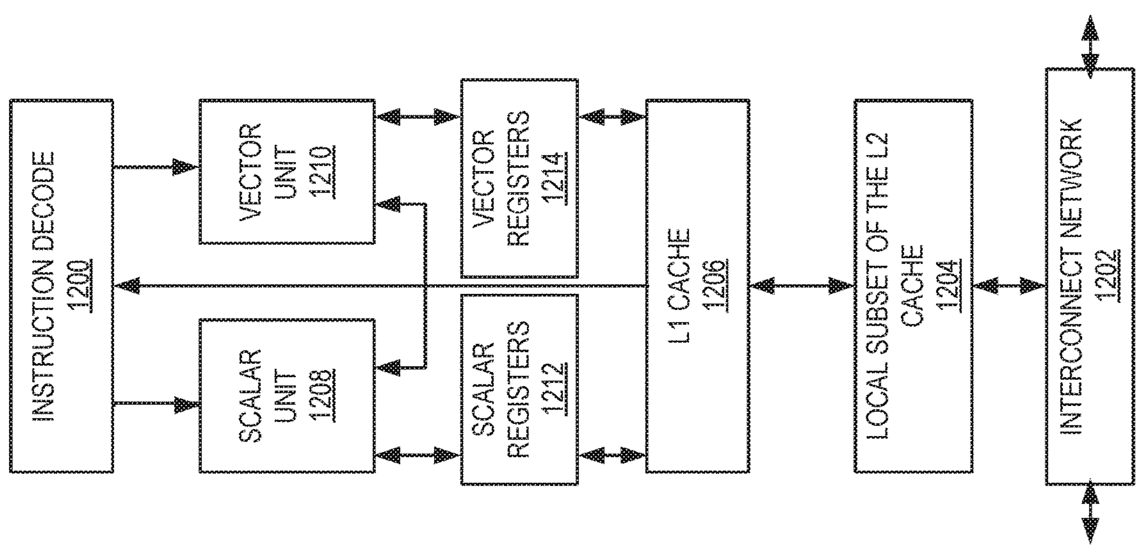

FIGS. 12A-B illustrate a block diagram of a more specific exemplary in-order core architecture than the one illustrated in FIGS. 2A and 2B, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
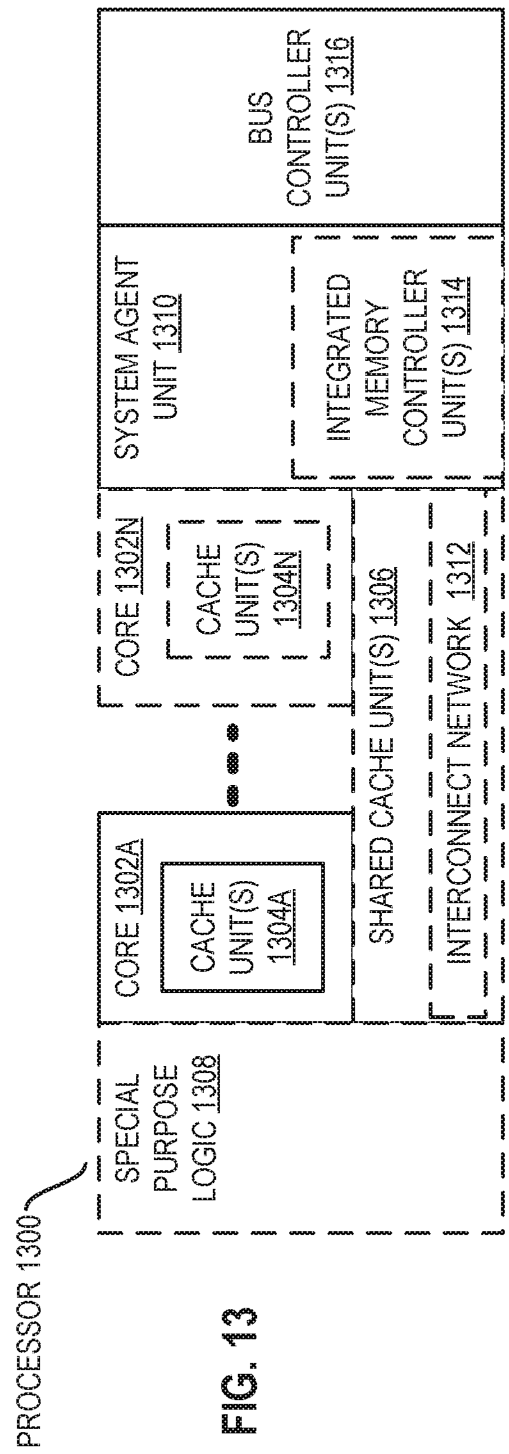
FIG. 13 is a block diagram of a processor 1300 that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general-purpose cores (e.g., general-purpose in-order cores, general-purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general-purpose in-order cores. Thus, the processor 1300 may be a general-purpose processor, coprocessor or special-purpose processor, such as, for example, a network or communication processor, compression engine, graphics processor, GPGPU (general-purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
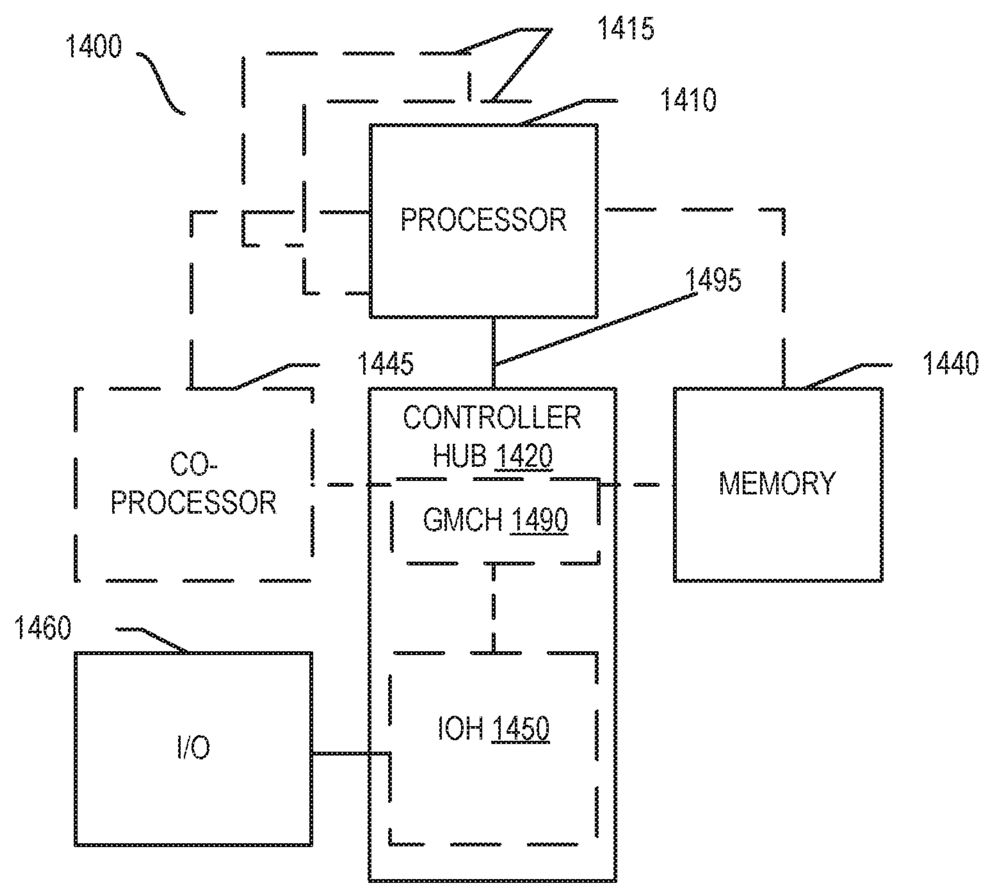
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
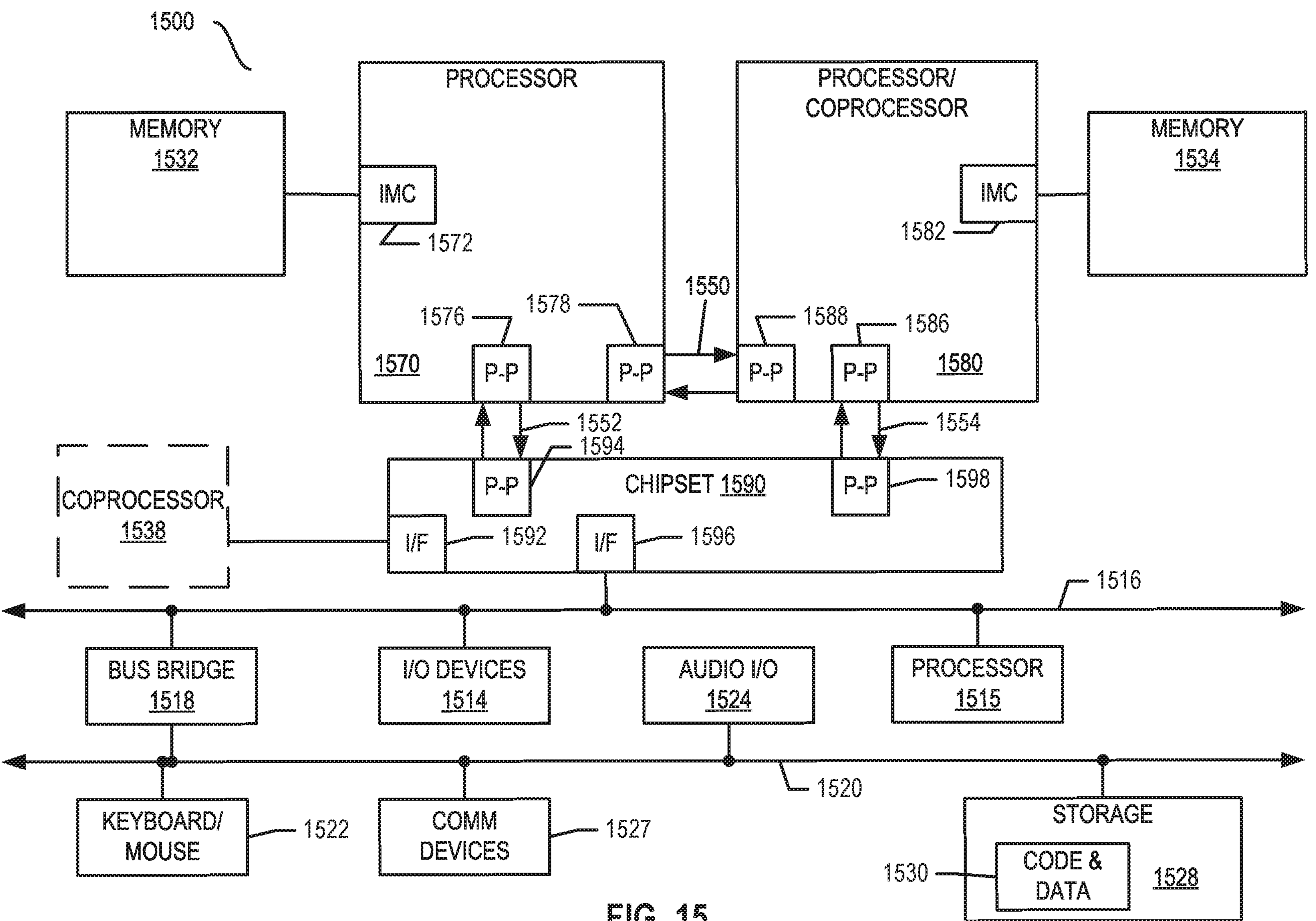

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
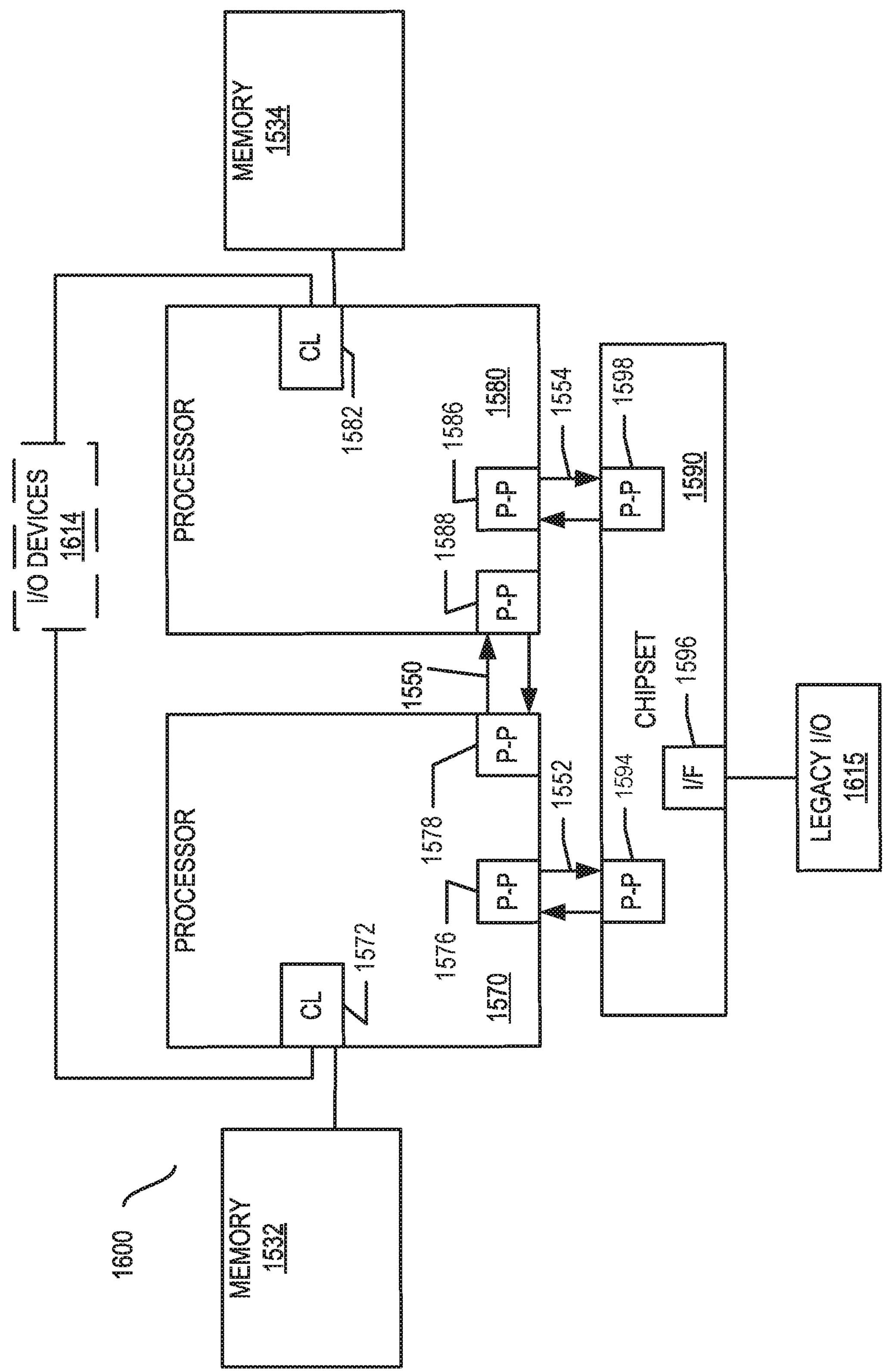

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
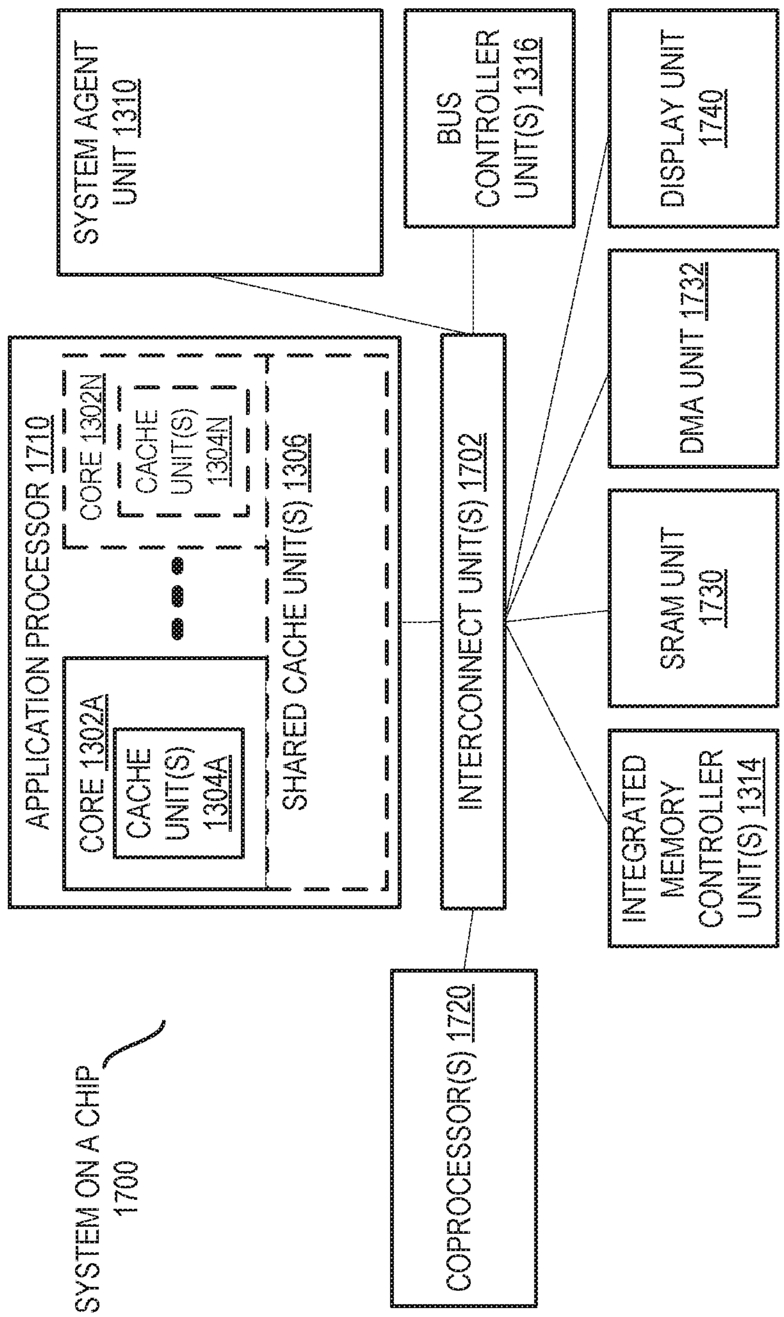

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
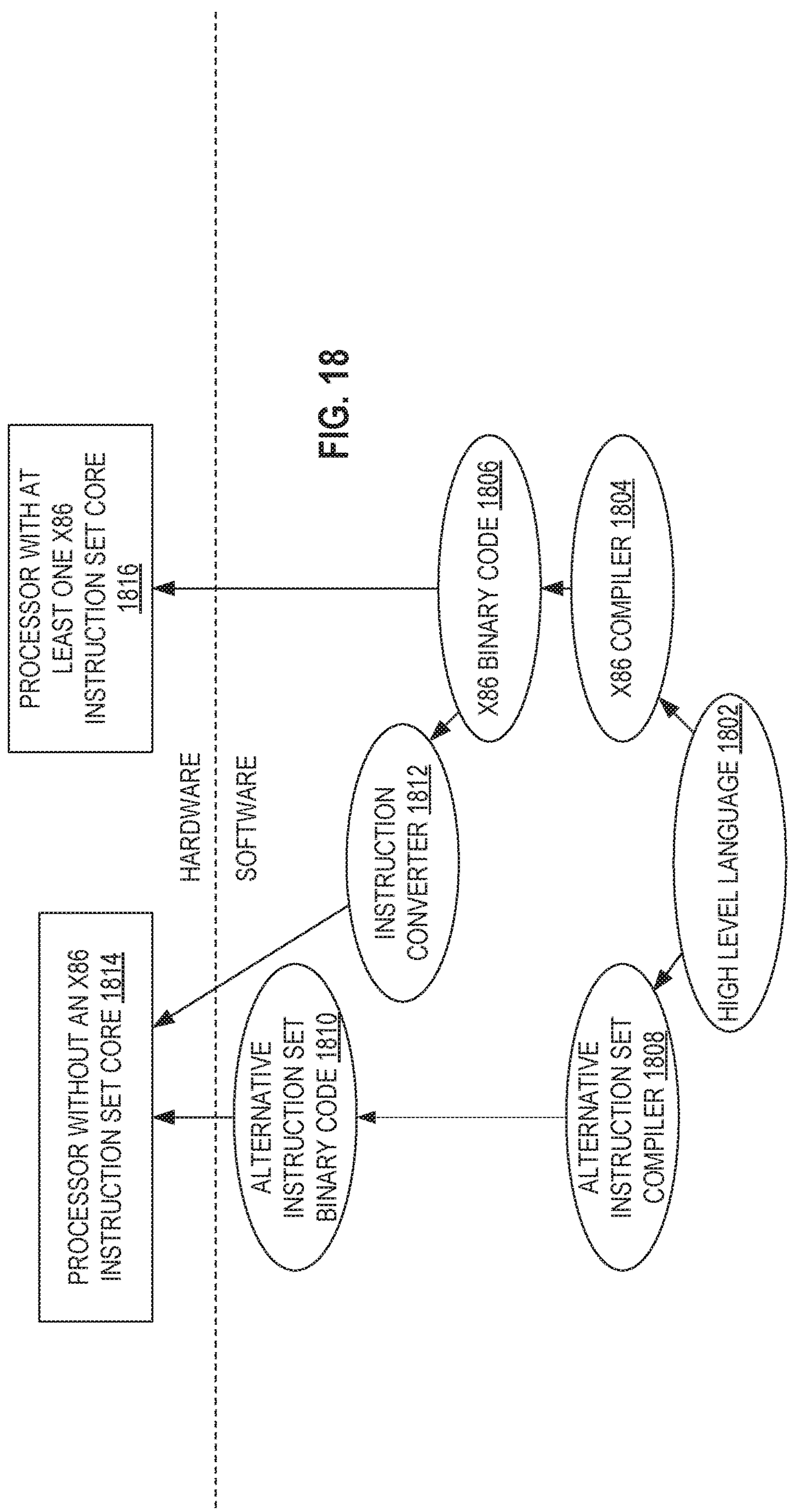
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

EXAMPLES

Exemplary embodiments of apparatuses, methods, and non-transitory machine readable medium are detailed as follows.

Example 1

An apparatus comprising: a decoder to decode a first instruction, the first instruction having at least a first field for a first opcode to indicate that execution circuitry is to set a first flag in a first register to indicate a mode of operation that is to cause a redirection of program flow to an exception handler upon the occurrence of an event; and execution circuitry to execute the decoded first instruction to set the first flag in the first register to indicate the mode of operation and to store an address of an exception handler in a second register.

Example 2

The apparatus of example 1, wherein the first instruction has a second field for the address of the exception handler.

Example 3

The apparatus of example 1, further comprising: a cache, an entry in the cache including a second flag that, when set, identifies an entry that, upon eviction, causes the first flag in the first register to be cleared and the second flag in the entry to be cleared.

Example 4

The apparatus of example 1, the decoder to decode a second instruction, the second instruction having a second field for a second opcode to indicate that the execution circuitry is to clear the first flag in the first register, and the execution circuitry is to execute the second decoded instruction to clear the first flag in the first register.

Example 5

The apparatus of example 1, the decoder to decode a second instruction, the second instruction having a second field for a second opcode to indicate that the execution circuitry is to store a value stored in a first instruction pointer register to a location in a memory, and the execution circuitry is to execute the second decoded instruction to store the value stored in the first instruction pointer register to the location in the memory.

Example 6

The apparatus of example 1, the decoder to decode a second instruction, the second instruction having a second field for a second opcode to indicate that execution circuitry is to load a cache identified with a value with data at a location in a memory, and the execution circuitry to execute the second decoded instruction to load the cache identified with the value with data at the location in the memory.

Example 7

The apparatus of example 1, the execution circuitry to copy an address in a first instruction pointer register into a second instruction pointer register and to copy the address of the exception handler to the first instruction pointer register.

Example 8

A method comprising: decoding a first instruction, the first instruction having a first field for a first opcode that indicates that execution circuitry is to set a first flag in a first register that indicates a mode of operation that redirects program flow to an exception handler upon the occurrence of an event; and executing the decoded first instruction to set the first flag in the first register that indicates the mode of operation and to store an address of an exception handler in a second register.

Example 9

The method of example 8, wherein the first instruction has a second field for the address of the exception handler.

Example 10

The method of example 8, further comprising: setting a second flag in an entry in a cache; and clearing the first flag in the first register and the second flag upon eviction of the entry from the cache.

Example 11

The method of example 8, further comprising: decoding a second instruction, the second instruction having a second field for a second opcode that indicates that execution circuitry is to clear the first flag in the first register; and executing the second decoded instruction to clear the first flag in the first register.

Example 12

The method of example 8, further comprising: decoding a second instruction, the second instruction having a second field for a second opcode that indicates that execution circuitry is to store a value stored in a first instruction pointer register to a location in in a memory; and executing the second decoded instruction to store the value stored in the first instruction pointer register to the location in the memory.

Example 13

The method of example 8, further comprising: decoding a second instruction, the second instruction having a second field for a second opcode that indicates that execution circuitry is to load a cache identified with a value with data at a location in a memory; and executing the second decoded instruction to load the cache identified with the value with data at the location in the memory.

Example 14

The method of example 8, further comprising: copying an address in a first instruction pointer register into a second instruction pointer register; and copying the address of the exception handler to the first instruction pointer register.

Example 15

A non-transitory machine-readable medium storing at least one instruction, which when executed causes a processor to perform a method, the method comprising: decoding a first instruction, the first instruction having a first field for a first opcode that indicates that execution circuitry is to set a first flag in a first register that indicates a mode of operation that redirects program flow to an exception handler upon the occurrence of an event; and executing the decoded first instruction to set the first flag in the first register that indicates the mode of operation and to store an address of an exception handler in a second register.

Example 16

The non-transitory machine-readable medium of example 15, wherein the first instruction has a second field for the address of the exception handler.

Example 17

The non-transitory machine-readable medium of example 15, further comprising: setting a second flag in an entry in a cache; and clearing the first flag in the first register and the second flag upon eviction of the entry from the cache.

Example 18

The non-transitory machine-readable medium of example 15, further comprising: decoding a second instruction, the second instruction having a second field for a second opcode that indicates that execution circuitry is to clear the first flag in the first register; and executing the second decoded instruction to clear the first flag in the first register.

Example 19

The non-transitory machine-readable medium of example 15, further comprising: decoding a second instruction, the second instruction having a second field for a second opcode that indicates that execution circuitry is to store a value stored in a first instruction pointer register to a location in a memory; and executing the second decoded instruction to store the value stored in the first instruction pointer register to the location in in the memory.

Example 20

The non-transitory machine-readable medium of example 15, further comprising: decoding a second instruction, the second instruction having a second field for a second opcode that indicates that execution circuitry is to load a cache identified with a value with data at a location in a memory; and executing the second decoded instruction to load the cache identified with the value with data at the location in the memory.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:

a decoder to decode a first single instruction, the first instruction having at least a first field for a first opcode to indicate that execution circuitry is to set a first flag in a first register to indicate a mode of operation that is to cause a redirection of program flow to an exception handler upon the occurrence of a cache eviction event and a second field to indicate an address for the exception handler;

execution circuitry to execute the decoded first single instruction to set the first flag in the first register to indicate the mode of operation and to store the address of the exception handler in a second register; and a cache, an entry in the cache including a second flag that, when set, is to identify an entry that, upon eviction, is to cause the first flag in the first register to be cleared and the second flag in the entry to be cleared.

2. The apparatus of claim 1, wherein the decoder is to decode a second instruction, the second instruction having a second field for a second opcode to indicate that the execution circuitry is to clear the first flag in the first register, and the execution circuitry is to execute the second decoded instruction to clear the first flag in the first register.

3. The apparatus of claim 1, wherein the decoder is to decode a second instruction, the second instruction having a second field for a second opcode to indicate that the execution circuitry is to store a value stored in a first instruction pointer register to a location in a memory, and the execution circuitry is to execute the second decoded instruction to store the value stored in the first instruction pointer register to the location in the memory.

4. The apparatus of claim 1, wherein the decoder is to decode a second instruction, the second instruction having a second field for a second opcode to indicate that execution circuitry is to load a cache identified with a value with data at a location in a memory, and the execution circuitry to execute the second decoded instruction to load the cache identified with the value with data at the location in the memory.

5. The apparatus of claim 1, wherein the execution circuitry is to copy an address in a first instruction pointer register into a second instruction pointer register and to copy the address of the exception handler to the first instruction pointer register.

6. A method comprising:

decoding a first instruction, the first single instruction having a first field for a first opcode that indicates that execution circuitry is to set a first flag in a first register that indicates a mode of operation that redirects program flow to an exception handler upon the occurrence of a cache eviction event and a second field to indicate an address for the exception handler;

executing the decoded first single instruction to set the first flag in the first register that indicates the mode of operation and to store the address of the exception handler in a second register and set a second flag in an entry in a cache; and clearing the first flag in the first register and the second flag upon eviction of the entry from the cache.

7. The method of claim 6, further comprising:

decoding a second instruction, the second instruction having a second field for a second opcode that indicates that execution circuitry is to clear the first flag in the first register; and executing the second decoded instruction to clear the first flag in the first register.

8. The method of claim 6, further comprising:

decoding a second instruction, the second instruction having a second field for a second opcode that indicates that execution circuitry is to store a value stored in a first instruction pointer register to a location in in a memory; and executing the second decoded instruction to store the value stored in the first instruction pointer register to the location in the memory.

9. The method of claim 6, further comprising:

decoding a second instruction, the second instruction having a second field for a second opcode that indicates that execution circuitry is to load a cache identified with a value with data at a location in a memory; and executing the second decoded instruction to load the cache identified with the value with data at the location in the memory.

10. The method of claim 6, further comprising:

copying an address in a first instruction pointer register into a second instruction pointer register; and copying the address of the exception handler to the first instruction pointer register.

11. A non-transitory machine-readable medium storing at least one instruction, which causes a processor to perform a method, the method comprising:

decoding a first instruction, the first single instruction having a first field for a first opcode that indicates that execution circuitry is to set a first flag in a first register that indicates a mode of operation that redirects program flow to an exception handler upon the occurrence of a cache eviction event and a second field to indicate an address for the exception handler;

executing the decoded first single instruction to set the first flag in the first register that indicates the mode of operation and to store the address of the exception handler in a second register and set a second flag in an entry in a cache; and clearing the first flag in the first register and the second flag upon eviction of the entry from the cache.

12. The non-transitory machine-readable medium of claim 11, further comprising:

decoding a second instruction, the second instruction having a second field for a second opcode that indicates that execution circuitry is to clear the first flag in the first register; and executing the second decoded instruction to clear the first flag in the first register.

13. The non-transitory machine-readable medium of claim 11, further comprising:

decoding a second instruction, the second instruction having a second field for a second opcode that indicates that execution circuitry is to store a value stored in a first instruction pointer register to a location in a memory; and executing the second decoded instruction to store the value stored in the first instruction pointer register to the location in in the memory.

14. The non-transitory machine-readable medium of claim 11, further comprising:

decoding a second instruction, the second instruction having a second field for a second opcode that indicates that execution circuitry is to load a cache identified with a value with data at a location in a memory; and executing the second decoded instruction to load the cache identified with the value with data at the location in the memory.

* * * * *